US011385716B1

(12) United States Patent
Mukherjee et al.

(10) Patent No.: US 11,385,716 B1
(45) Date of Patent: Jul. 12, 2022

(54) IMPEDANCE SHAPING FOR HAPTIC INTERFACES ON WEARABLE DEVICES

(71) Applicant: FACEBOOK TECHNOLOGIES, LLC, Menlo Park, CA (US)

(72) Inventors: Gaurav Mukherjee, Redmond, WA (US); Kevin Shimasaki, Woodinville, WA (US); Raymond King, Woodinville, WA (US); Ali Israr, Bothell, WA (US); Cesare Valerio Parise, Seattle, WA (US); Daniele Piazza, Redmond, WA (US); Majed Jamal Samad, Redmond, WA (US); Elia Gatti, Bothell, WA (US); Nicholas Roy Corson, Woodinville, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 96 days.

(21) Appl. No.: 17/074,431

(22) Filed: Oct. 19, 2020

Related U.S. Application Data

(60) Provisional application No. 62/933,257, filed on Nov. 8, 2019.

(51) Int. Cl.
*H04B 3/36* (2006.01)
*G06F 3/01* (2006.01)
*G08B 6/00* (2006.01)
*B06B 1/04* (2006.01)
*G02B 27/01* (2006.01)
*G06F 1/16* (2006.01)

(52) U.S. Cl.
CPC .............. *G06F 3/016* (2013.01); *B06B 1/045* (2013.01); *G02B 27/017* (2013.01); *G08B 6/00* (2013.01); *G06F 1/163* (2013.01); *G06F 2203/013* (2013.01)

(58) Field of Classification Search
CPC .... G06F 3/016; G06F 1/163; G06F 2203/013; B06B 1/045; G02B 27/017; G08B 6/00
See application file for complete search history.

(56) References Cited

U.S. PATENT DOCUMENTS

| 10,678,334 | B1 * | 6/2020 | Pezent | G06F 3/016 |
| 10,706,693 | B1 * | 7/2020 | Castillo Canales | G08B 6/00 |
| 11,011,033 | B1 * | 5/2021 | Piazza | G06F 1/163 |
| 2020/0125171 | A1 * | 4/2020 | Morun | A61B 5/296 |
| 2021/0286436 | A1 * | 9/2021 | Parizi | G01S 13/874 |

* cited by examiner

*Primary Examiner* — Toan N Pham
(74) *Attorney, Agent, or Firm* — Morgan, Lewis & Bockius LLP

(57) ABSTRACT

An apparatus for creating and tuning haptic feedback is provided. The apparatus includes (A) a brace with first and second portions, (B) a vibrotactile actuator, coupled to the first portion of the brace, configured to apply haptic stimulations to a user, and (C) a linear actuator, coupled to the second portion of the brace, configured to (i) obtain a signal generated based on information about the user's body at a target location of the user and (ii) adjust a tension of the brace according to the signal. In some embodiments, the apparatus also includes one or more sensors configured to generate the information about the user's body at the target location. Furthermore, a controller may be configured to: (i) generate the signal based on the information about the user's body at the target location generated by the one or more sensors and (ii) provide the signal to the linear actuator.

20 Claims, 15 Drawing Sheets
(6 of 15 Drawing Sheet(s) Filed in Color)

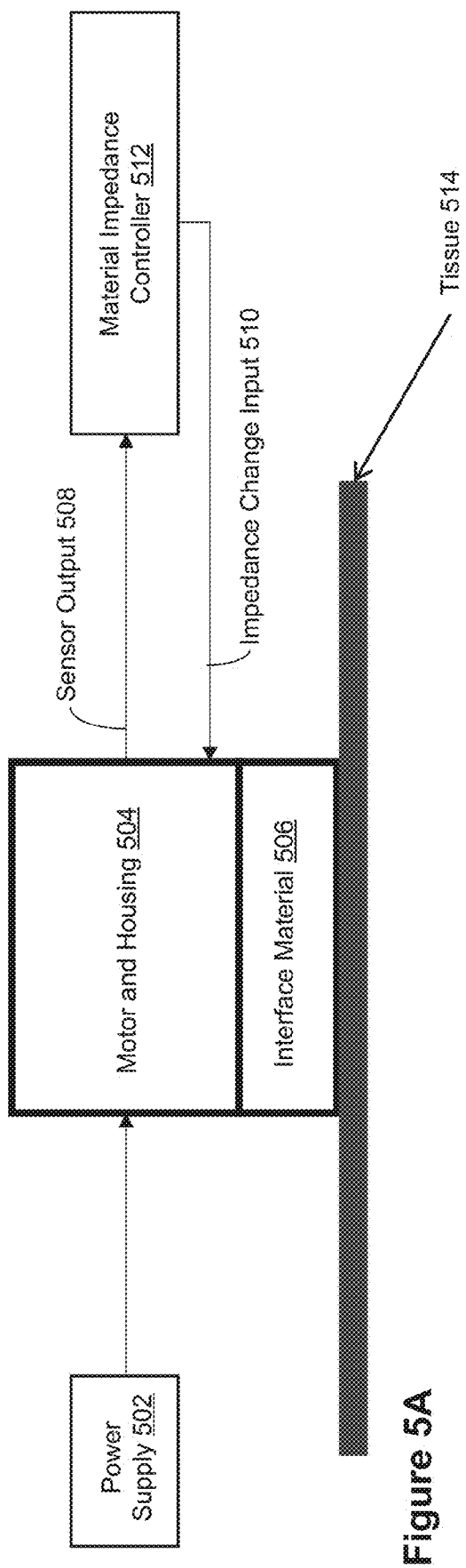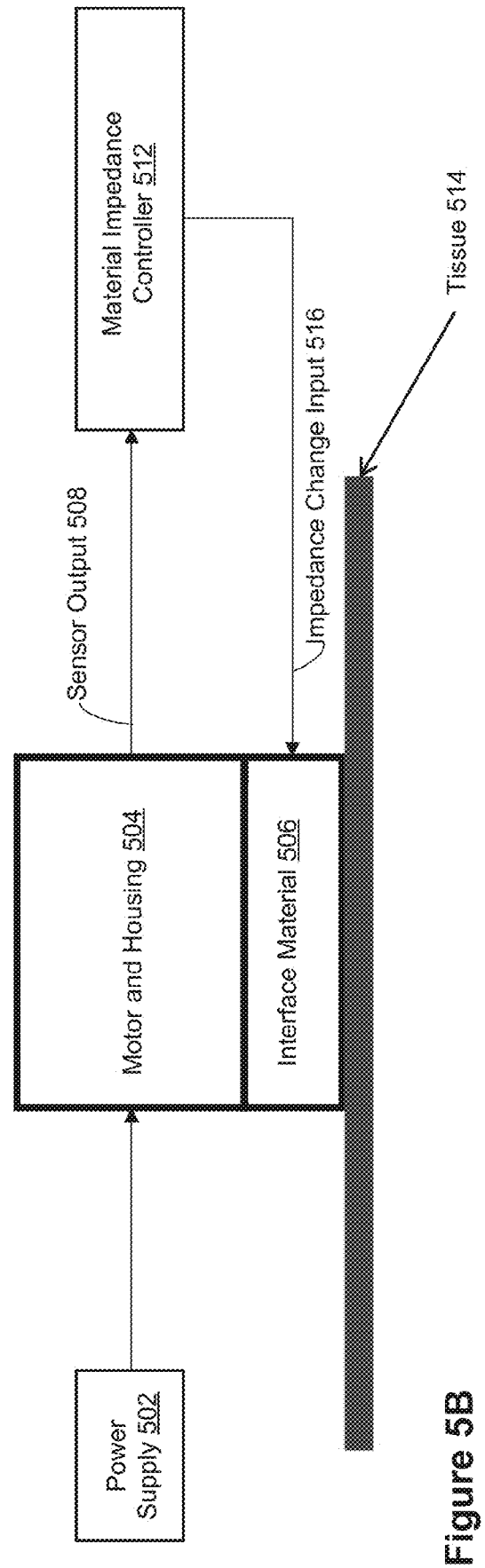

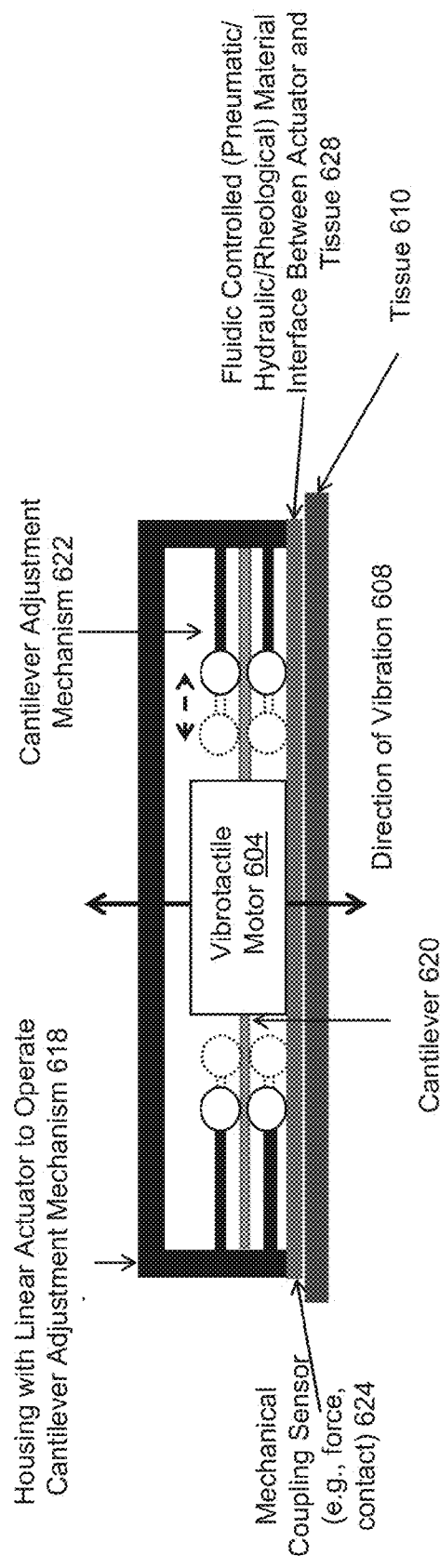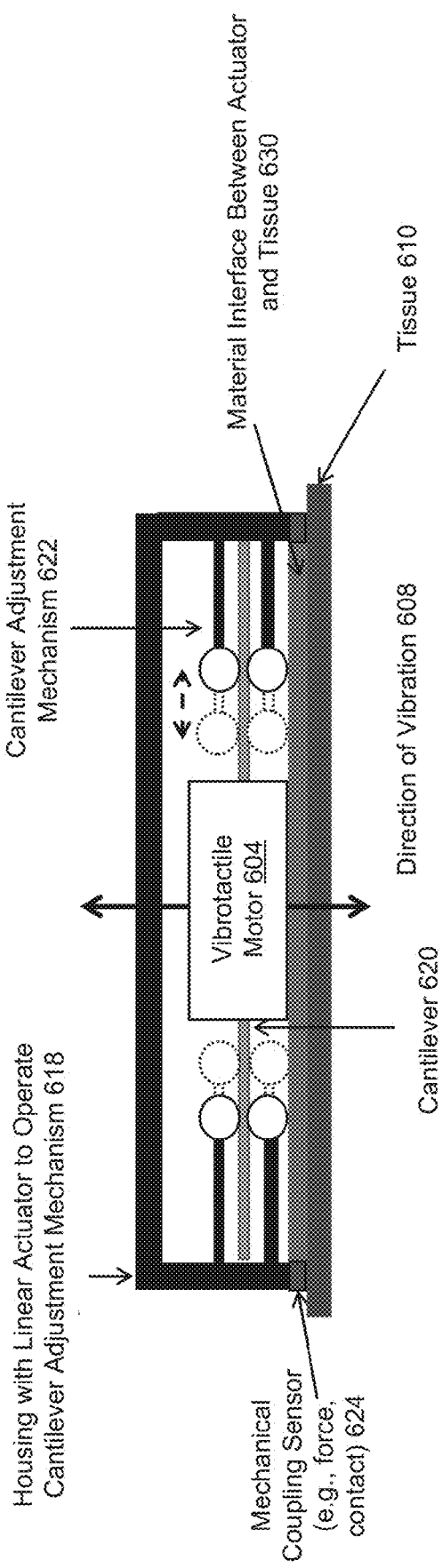

US 11,385,716 B1

IMPEDANCE SHAPING FOR HAPTIC INTERFACES ON WEARABLE DEVICES

CROSS-REFERENCE TO RELATED APPLICATIONS

This application claims priority to U.S. Provisional Application 62/933,257, filed Nov. 8, 2019, entitled "Impedance Shaping for Haptic Interfaces on Wearable Devices," which is incorporated herein by reference in its entirety.

TECHNICAL DATA FIELD

This application relates generally to haptic stimulations, including haptic stimulations that are applied to users of artificial-reality devices.

BACKGROUND

Some haptic devices (sometimes called "haptic displays") provide haptic feedback to users by applying forces (e.g., tensional and/or radial forces) to a portion of the user's body (e.g., to an anatomical cross-section of a user's wrist). The perceived haptic feedback (e.g., vibration) changes with the amount of force applied, and also according to the stiffness and mechanical impedance of the tissue site being stimulated. Conventional haptic devices, however, fail to account for variances in stiffness and mechanical impedance in body tissues (i.e., they do not account for variability between users, or even variability within a given user). Because of this, conventional haptic devices cannot optimize the forces applied to users (e.g., haptic feedback applied to a first user may feel weak while haptic feedback of the same force applied to a second user may feel intense and uncomfortable). Moreover, a direct mechanical coupling between a vibrotactile actuator and its housing can cause the entire device (e.g., a wrist-worn band) to vibrate, which may be undesirable in some circumstances. This result is known as parasitic haptic signal leakage, and such leakage can limit the ability of a haptic device to apply localized stimulations to a user's body, which reduces an overall efficiency and satisfaction of the haptic device.

SUMMARY

Accordingly, there is a need for haptic devices and systems that can impart localized, uniform haptic stimulations across users. In this way, users can expect a consistent experience with haptic devices, which will help drive adoption of these devices. The designs discussed herein use the technique of impedance shaping to isolate and/or localize vibrations, and tune vibrations for individual users of artificial-reality devices (e.g., wrist-worn haptic devices). Mechanical impedance shaping (sometimes called z-shaping) is the process of systematically tuning the mechanical impedance of various parts of the actuator-tissue system to maximize transmission of vibrations and displacement in an intended direction. To optimize the haptic throughput for efficiency and consistency systematically (as will be discussed in detail below), various design parameters of the actuator can be tuned (either in the design phase or during use), and various actuators can be used, such as resonant, non-resonant, mechanical, electric, pneumatic, hydraulic, or rheological actuators.

(A1) In accordance with some embodiments, an apparatus is provided that creates haptic stimulations. The apparatus includes a brace with a first portion and a second portion. The apparatus also includes a vibrotactile actuator coupled to the first portion of the brace. The vibrotactile actuator is configured to apply a haptic stimulation to a user. The apparatus also includes a linear actuator coupled to the second portion of the brace. The linear actuator is configured to: (i) obtain a signal generated based on information about the user's body at a target location of the user, and (ii) adjust a tension of the brace according to the signal. Note that the linear actuator and/or the vibrotactile actuator can be swapped (or otherwise modified) for other actuators or mechanisms (e.g., one or more of the structures shown in FIGS. 6A-6G), at least in some embodiments.

(A2) In some embodiments of A1, the apparatus further includes one or more sensors (e.g., sensors 224, FIG. 2A) configured to generate the information about the user's body at the target location. The one or more sensors may be coupled to the linear actuator, or some other component of the apparatus, such as the brace or the vibrotactile actuator.

(A3) In some embodiments of A2, a controller is configured to: (i) generate the signal based on the information about the user's body at the target location generated by the one or more sensors, and (ii) provide the signal to the linear actuator. In some embodiments, the controller is part of the apparatus, and the controller is communicatively coupled to the linear actuator (and, potentially, the vibrotactile actuator). The controller may also be communicatively coupled to the one or more sensors.

(A4) In some embodiments of A2, the linear actuator is communicatively coupled to the one or more sensors. The one or more sensors are further configured to generate the signal based on the information about the user's body at the target location. In such embodiments, the linear actuator is configured to obtain the signal from the one or more sensors.

(A5) In some embodiments of A4, the one or more sensors are configured to generate the signal by determining stiffness or mechanical impedance of a tissue site of the user. In some embodiments, the information about the user's body at the target location includes biomechanics of a tissue (e.g., biomechanical stiffness, impedance) of the user's body at the target location.

(A6) In some embodiments of any of A2-A5, adjusting the tension of the brace tunes vibration characteristics of the apparatus by minimizing vibrations transmitted from the vibrotactile actuator to the linear actuator (and other portions of the apparatus as well). In some embodiments, the linear actuator is further configured to tune vibration characteristics of the apparatus by adjusting the tension of the brace.

(A7) In some embodiments of any of A1-A6, the linear actuator is configured to adjust the radius of the brace in order to adjust the tension of the brace.

(A8) In some embodiments of any of A1-A7, the vibrotactile actuator is configured to move in one or more first directions, the linear actuator is configured to move in one or more second directions, and the one or more first directions are different from the one or more second directions (e.g., they are perpendicular to each other).

(A9) In some embodiments of any of A1-A8, the brace is a silicone membrane. In some other embodiments, the brace is a spring.

(A10) In some embodiments of any of A1-A9, the linear actuator adjusts the tension of the brace to (i) account for variations in tissue biomechanics at the target location and (ii) provides a uniform perception of vibration to the user.

(A11) In some embodiments of any of A1-A10, the linear actuator is further configured to account for a squeeze (or a tensioning force) applied when the first user wears the haptic device.

(A12) In some embodiments of any of A1-A11, the apparatus further includes a housing that at least partially houses the vibrotactile actuator, the linear actuator, and the brace.

(A13) In some embodiments of any of A1-A12, the vibrotactile actuator is suspended by the brace.

(A14) In some embodiments of any of A1-A13, the linear actuator is communicatively coupled to a computing device, the linear actuator is configured to obtain the signal from the computing device, and the computing device is configured to: (i) generate the signal based on the information about the user's body at the target location; and (ii) provide the signal to the linear actuator.

(A15) In some embodiments of A14, the vibrotactile actuator is communicatively coupled to the computing device, and the vibrotactile actuator is further configured to: (i) receive vibration parameters from the computing device and (ii) actuate based on the vibration parameters to apply the haptic stimulation to the user. In some other embodiments, the vibrotactile linear actuator is configured to obtain a drive signal from the computing device, and the computing device is configured to: (i) generate the drive signal based on the information about the user's body at the target location and (ii) provide the signal to the vibrotactile actuator.

(A16) In some embodiments of any of A1-A15, the apparatus further includes a material interface configured to be positioned between the vibrotactile actuator and the user's body. The material interface is further configured to transmit vibrations between the vibrotactile actuator and the user's body that match a mechanical impedance of the user's body at the target location of the user. In some embodiments, the material interface is fluidically controlled. In such embodiments, a fluidic state (e.g., hardness, softness) of the material interface is set based on the information about the user's body at the target location of the user. The material interface may be fluidically controlled using pneumatic control, hydraulic control, or rheological control.

(B1) In another aspect, a wearable device is provided that includes a wearable structure to be worn on a portion of a user's body. The wearable device also includes a plurality of haptic assemblies, whereby each haptic assembly is coupled to the wearable structure. Each haptic assembly includes the structure of the apparatus of A1 (and, in some embodiments, A2-A16).

(B2) In some embodiments of B1, the wearable structure is a wrist-worn band that houses the plurality of haptic assemblies.

(B3) In some embodiments of any of B1-B2, each brace is configured to improve power efficiency of the wearable device by generating the localized vibrations.

(B4) In some embodiments of any of B1-B3, a first haptic assembly of the plurality of haptic assemblies is configured according to biomechanics of a tissue of the user at a first target location. A second haptic assembly, distinct from the first haptic assembly, of the plurality of haptic assemblies is configured according to biomechanics of a tissue of the user at a second target location, distinct from the first target location.

(B5) In some embodiments of B4, the first haptic assembly is positioned to be worn near the first target location and the second haptic assembly is positioned to be worn near the second target location.

(B6) In some embodiments of any of B1-B5, the wearable structure is configured to be worn by the user by applying a tensioning force or a squeeze about an anatomical cross-section of the user's body (e.g., a wrist).

(B7) In some embodiments of any of B1-B6, each vibrotactile actuator is communicatively coupled to a computing device. Each vibrotactile actuator is configured to vibrate at a respective frequency in response to receiving one or more signals from the computing device.

(C1) In another aspect, an artificial-reality device is provided that includes a head-mounted display that (i) presents content to a user and (ii) includes an electronic display. The artificial-reality device also includes a computing device that is (i) communicatively coupled to the head-mounted display and (ii) configured to generate and transmit one or more signals that correspond to content displayed on the electronic display. The artificial-reality device also includes a wearable device that is communicatively coupled to the computing device. The wearable device includes (i) a wearable structure to be worn on a portion of the user's and (ii) a plurality of haptic assemblies, each of which is coupled to the wearable structure. Each haptic assembly includes the structure of the apparatus of A1 (and, in some embodiments, A2-A16).

(D1) According to some embodiments, a method is provided for isolating (or localizing) vibrations applied to a user by a haptic device. The haptic device includes: (i) a brace with a first portion and a second portion, (ii) a vibrotactile actuator coupled to the first portion of the brace, and (iii) a linear actuator coupled to the second portion of the brace. The method includes obtaining, by the linear actuator, a signal generated based on information about a user's body at a target location of a user of the haptic device. The method also includes adjusting, by the linear actuator, a tension of the brace according to the signal, thereby tuning vibration characteristics of the haptic device.

(D2) In some embodiments of D1, the information includes biomechanics of a tissue (e.g., biomechanical stiffness, impedance) of the user's body at the target location.

(D3) In some embodiments of any of D1-D2, the haptic device further comprises one or more sensors (e.g., sensors 224, FIG. 2A). In such embodiments, the method may further include generating the signal based on data from one or more sensors.

(D4) In some embodiments of D3, the haptic device further includes a controller, and generating the signal is performed by the controller.

(D5) In some embodiments of any of D1-D4, adjusting the tension of the brace includes adjusting a radius of the brace.

(D6) In some embodiments of any of D1-D5, the haptic device further comprises a material interface positioned between the vibrotactile actuator and the user's body. The method further includes adjusting (e.g., by the controller) a fluidic state of the material interface based on the information about the user's body at the target location of the user. In some embodiments, adjusting the fluidic state of the material interface includes signaling a source (e.g., a pneumatic source) to add or remove fluid from the material interface.

(D7) In another aspect, a haptic device (e.g., haptic device 220, FIG. 2A) is provided. In some embodiments, the haptic device includes one or more processors, and memory storing one or more programs, which when executed by the one or more processors cause the haptic device to perform the method described in any one of D1-D6.

(D8) In yet another aspect, a haptic device is provided and the haptic device includes means for performing the method described in any one of D1-D6.

(D9) In still another aspect, a non-transitory computer-readable storage medium is provided. The non-transitory computer-readable storage medium stores executable instructions that, when executed by the haptic device with one or more processors/cores, cause the haptic device to perform the method described in any one of D1-D6.

(E1) According to some embodiments, an apparatus is provided that creates haptic stimulations. The apparatus includes a membrane with a first portion and a second portion and an actuator (e.g., a vibrotactile actuator) coupled to and supported by the first portion of the membrane. The actuator is configured to apply a haptic stimulation to a user of the apparatus at a target location on the user's body, whereby the target location on the user's body has a known impedance. The apparatus also includes a housing that is coupled to the second portion of the membrane and at least partially houses the membrane and the actuator. Furthermore, the membrane is selected according to the known impedance of the target location, such that one or more mechanical properties of the membrane, including an elasticity of the membrane, complement the known impedance of the target location to tune vibration characteristics of the actuator at the target location. Note that in some embodiments, the membrane is a different structure, such as a spring.

(E2) In some embodiments of E1, the apparatus also includes another actuator (e.g., linear actuator 302), coupled to the second portion of the membrane, configured to: (i) obtain a signal generated based on information about the user's body at the target location, whereby the information about the user's body at the target location includes the known impedance and (ii) adjust a tension of the membrane according to the signal.

(E3) In some embodiments of E2, the apparatus also includes one or more sensors configured to generate the information about the user's body at the target location.

(E4) In some embodiments of E3, a controller is configured to: (i) generate the signal based on the information about the user's body at the target location generated by the one or more sensors, and (ii) provide the signal to the other actuator.

(E5) In some embodiments of E4, the controller is part of the apparatus, and the controller is communicatively coupled to the other actuator (and, in some embodiments, the actuator).

(E6) In some embodiments of any of E4-E5, the controller is further configured to: (i) generate a drive signal based, at least in part, on the information about the user's body at the target location, and (ii) provide the drive signal to the actuator, which causes the actuator to vibrate according to the drive signal. When the apparatus is worn by the user, the actuator vibrates and applies a first haptic stimulation to the user of the apparatus at the target location on the user's body, according to the drive signal.

(E7) In some embodiments of E6, the controller is in communication with an artificial-reality device, and the drive signal is also based on media presented by the artificial-reality device.

(E8) In some embodiments of any of E4-E7, the actuator vibrates with first parameters, including a frequency and an amplitude, in response to receiving the drive signal from the controller. Moreover, the drive signal defines the frequency and the amplitude. In other words, the drive signal is encoded by the controller to cause the actuator to vibrate in a certain way (i.e., vibrate at the frequency with the amplitude).

(E9) In some embodiments of any of E1-E8, the known impedance includes measurements of tissue biomechanics of the user's body at the target location.

(E10) In some embodiments of any of E1-E9, the apparatus further includes a material interface configured to be positioned between the actuator and the user's body. The material interface is further configured to transmit vibrations between the actuator and the user's body that match a mechanical impedance of the user's body at the target location of the user. In some embodiments, the material interface is fluidically controlled. In such embodiments, a fluidic state (e.g., hardness, softness) of the material interface is set based on the information about the user's body at the target location of the user. The material interface may be fluidically controlled using pneumatic control, hydraulic control, or rheological control.

(E11) In some embodiments, a method for fabricating the haptic device of E1-E10 is provided. The method includes determining information about the user's body at a target location. In some embodiments, the information about the user's body includes the known impedance of the user's body at the target location (e.g., biomechanical stiffness and impedance of the user's tissues). The method further includes selecting a membrane that matches/complements the information about the user's body at the target location. For example, the membrane is selected accordance to the known impedance of the user's body at the target location. The method further includes attaching an actuator to the membrane to form a haptic assembly, and attaching the haptic assembly to a housing, which may be an article worn by a user, such as a watch band.

(F1) In accordance with some embodiments, an apparatus is provided that creates haptic stimulations to a user. The apparatus includes a membrane with a first portion and a second portion. The apparatus also includes means for applying a haptic stimulation to the user. The apparatus also includes means for optimizing a behavior of the means for applying the haptic stimulation to the user. In some embodiments, the means for applying the haptic stimulation to the user includes a first actuator (e.g., actuator 306), coupled to the first portion of the membrane, that is configured to vibrate or otherwise oscillate. In some embodiments, the means for optimizing the behavior of the actuator includes a second actuator (e.g., actuator 302), coupled to the second portion of the membrane, that is configured to adjust a tension of the membrane according to a control signal (e.g., the structure shown in FIG. 6C). In some embodiments, the second actuator obtains the control signal, which is generated based on information about the user's body at a target location of the user. The means for optimizing the behavior of the first actuator may alternatively include springs of different stiffnesses. Alternatively, the means for optimizing the behavior of the actuator may be part of a housing of the apparatus (e.g., an actuator incorporated into the housing), as shown in FIG. 6A.

In some embodiments, the means for applying the haptic stimulation to the user includes a ferrous core magnetically coupled with a magnetic field generator (which together form a solenoid). In such embodiments, the means for optimizing the behavior of the means for applying the haptic stimulation to the user includes a field-strength adjustment mechanism that is configured to adjust an output of the magnetic field generator. An example of this structure is shown in FIG. 6B.

(F2) In some embodiments of F1, the apparatus further includes one or more sensors (e.g., sensors 224, FIG. 2A) configured to generate information about the user's body at the target location. The one or more sensors may be coupled to the means for optimizing the behavior of the means for applying the haptic stimulation to the user, or some other component of the apparatus.

(F3) In some embodiments of any of F1-F2, the apparatus further includes a material interface to be positioned between the means for applying the haptic stimulation to the user and the user's body. The material interface is configured to transmit vibrations between the means for applying the haptic stimulation to the user and the user's body that match a mechanical impedance of the user's body at a target location. In some embodiments, the material interface is fluidically controlled. In such embodiments, a fluidic state (e.g., hardness, softness) of the material interface is set based on the information about the user's body at the target location of the user. The material interface may be fluidically controlled using pneumatic control, hydraulic control, or rheological control. The material interface may be a material that can hold a fluid, such as a sealed bladder or similar structure.

(G1) According to some embodiments, a method is provided for optimizing haptic throughput efficiency and consistency. The method is performed at a haptic device that includes a vibrotactile actuator. The method includes applying a haptic stimulation, using the vibrotactile actuator, to a user of the haptic device at a target location on the user's body. The method also includes concurrently measuring (i) mechanical impedance of the vibrotactile actuator, and (ii) tissue mechanical impedance of the target location. The method also includes tuning vibration output from the vibrotactile actuator based on a relationship between the mechanical impedance of the vibrotactile actuator, the tissue mechanical impedance of the target location, and a perceived vibration at the target location.

(G2) In some embodiments of G1, the haptic device further includes an interface material between the vibrotactile actuator and a tissue at the target location, and the method further includes tuning the interface material between the vibrotactile actuator and the tissue for maximum transmission of the haptic stimulation.

(G3) In some embodiments of any of G1-G2, the vibrotactile actuator is coupled to a housing, and the method further includes tuning mechanical coupling between the vibrotactile actuator and the housing to prevent parasitic leakage of vibrotactile signal in unintended directions.

(G4) In some embodiments of any of G1-G3, the haptic device further comprises one or more sensors configured to measure the tissue mechanical impedance, and the method further includes: detecting, based on data from the one or more sensors, a change in the tissue mechanical impedance, during a session of use of the haptic device; and, in response to detecting the change in the tissue mechanical impedance, adjusting the vibration output from the vibrotactile actuator based on a degree of the change.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A and 5B show example control strategies for haptic devices according to some embodiments.

FIGS. 6A through 6G show additional examples of tunable haptic devices according to some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting

[the stated condition or event]" or "in accordance with a determination that [a stated condition or event] is detected," depending on the context.

It will also be understood that, although the terms first, second, etc. are, in some instances, used herein to describe various elements, these elements should not be limited by these terms. These terms are used only to distinguish one element from another.

Figure 1A:
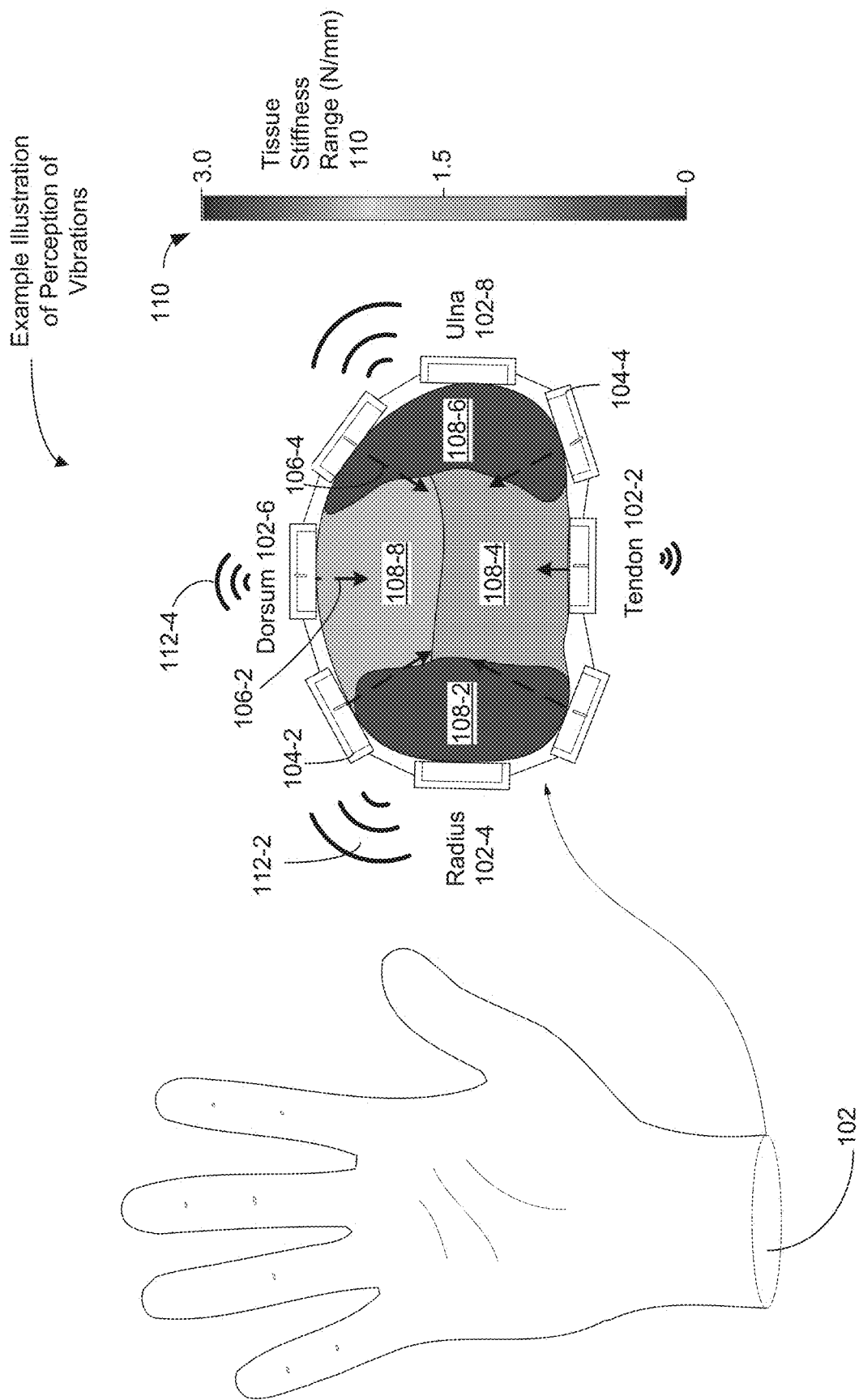
FIG. 1A is an example illustration of perception of vibrations at different locations about a user's wrist, according to some embodiments.

FIG. 1A shows perception of vibrations at different locations on a user's wrist, according to some embodiments. In particular, FIG. 1A shows a wearable device worn around a user's wrist 102, along with different cross-sectional locations of the user's wrist 102, including the tendon 102-2, radius 102-4, dorsum 102-6, and ulna 102-8, along with their corresponding tissue stiffness. An example scale 110 of tissue stiffness is shown next to the cross-sectional view of the user's wrist 102. As shown, the tissue region 108-2 corresponding to the radius 102-4 and the tissue region 108-6 corresponding to the ulna 102-8 each has an increased tissue stiffness (nearly 3.0 Newtons per millimeter, N/mm). In contrast, the tissue region 108-8 corresponding to the dorsum 102-6 has a lower (but still relatively high) tissue stiffness (around to 2 N/mm), while the tissue region 108-4 corresponding to the tendon 102-2 has an even lower tissue stiffness (closer to 1.5 N/mm). The differences in tissue stiffness illustrated in FIG. 1A can be attributed, at least in part, to biomechanical stiffness and impedance of the tissues. Note that the tissue stiffnesses illustrated in FIG. 1A are merely one set of possible stiffnesses, and the values will not be consistent across all users. For example, a person with a lean, boney wrist will have dramatically different tissue stiffnesses than another person with a soft wrist. Nevertheless, as will be explained in detail below, the haptic devices discussed herein can account for these differences between users.

With tissue stiffness in mind, the wearable device in this example includes several haptic assemblies 104 (e.g., the haptic assembly 104-2 and the haptic assembly 104-4, each including a vibrotactile actuator) connected to a wearable structure (e.g., a wrist band) that are configured to vibrate at a predetermined frequency (e.g., 20 Hz). During an example operation, each haptic assembly 104 vibrates at the predetermined frequency, which causes the user to perceive different vibration stimulations across a surface of his or her wrist, depending on the tissue stiffness of the corresponding tissue region, as indicated by the different lengths of the dashed lines in FIG. 1A. For example, line 106-2 in the tissue region 108-8 (which, as explained above, has a medium tissue stiffness) is shorter than the line 106-4 in the tissue region 108-6 (which, as explained above, has a high tissue stiffness). As such, this user is likely to perceive vibrations next to the ulna 102-8 and the radius 102-4 much more than vibrations next to the dorsum 102-6 (and even more so than the tendon 102-2), due to the differences in the tissue stiffness of the corresponding tissue regions. Thus, the variation in vibration perception can be attributed to the biomechanical stiffness and impedance of the user's tissues. Typically, vibrations over bony regions (stiffer) are perceived differently from vibrations over soft tissue regions (less stiff). This variation can be further affected by the level of squeeze applied due to coupling forces (e.g., forces used to secure the haptic assemblies to the user at target locations). Put another way, a perceived can vibration change according to the amount of squeeze applied and the stiffness and mechanical impedance of the tissue site being vibrated. The amount of squeeze applied relates to a fit (or, how tightly fit) a wearable device is attached to the user's body.

Figure 1B:
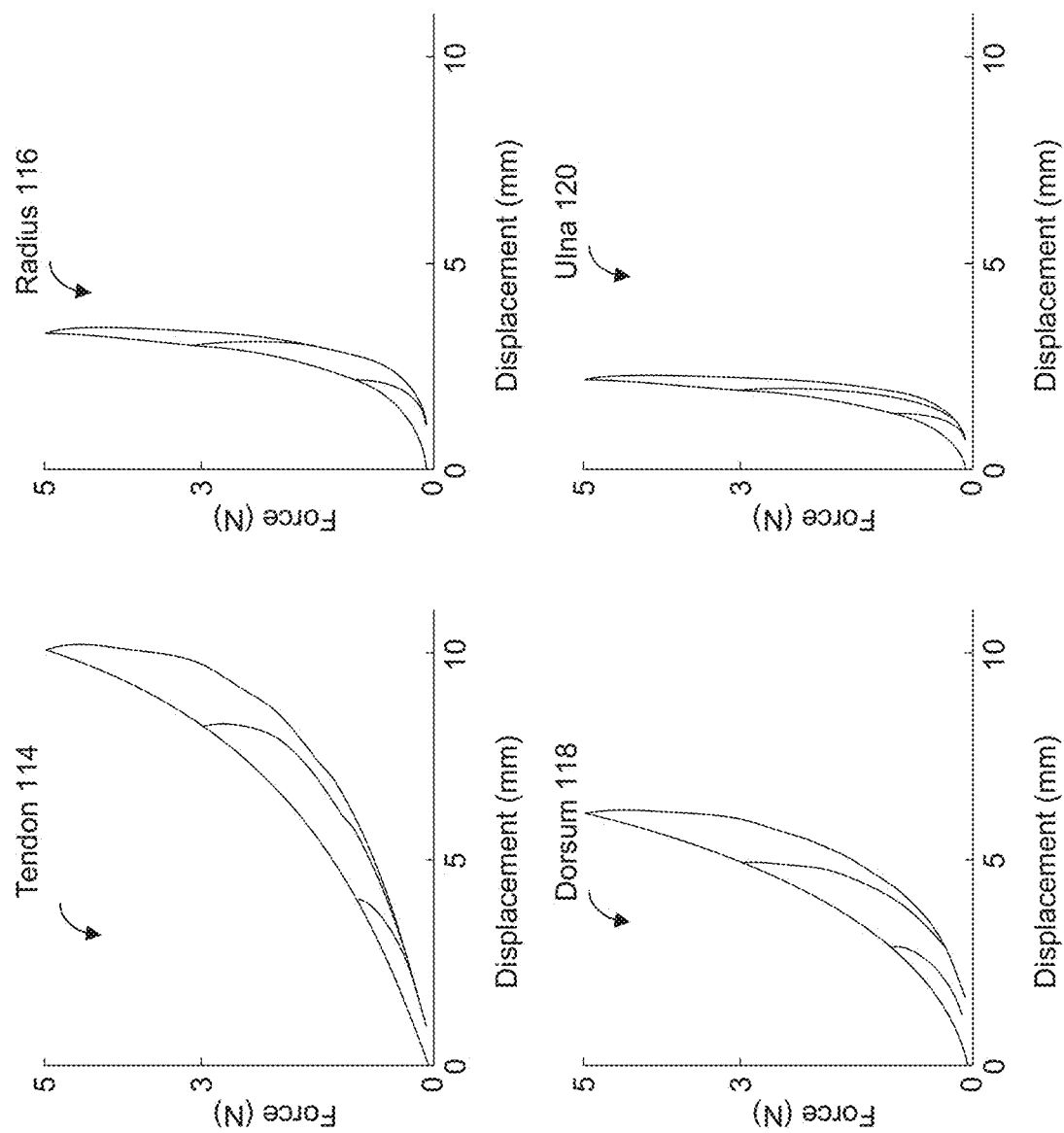
FIG. 1B illustrates example plots of stiffness for various locations around a user's wrist, according to some embodiments.

FIG. 1B illustrates example plots of stiffness (sometimes called hysteresis loops) for various locations around a user's wrist, according to some embodiments. The plots 114, 116, 118, and 120 correspond to force versus displacement curves for the tendon 102-2, the radius 102-4, the dorsum 102-6, and the ulna 102-8 portions of a user's wrist (FIG. 1), respectively. As shown, a relatively small displacement (e.g., less than 4 mm) of an actuator is needed to impart (i.e., deliver, apply) a substantial force (e.g., approximately 5 N) to a user along the radius 116 and ulna 120 portions of the user's wrist. In contrast, for the softer tissue regions, a relatively large displacement of the actuator is needed to impart the substantial force to a user along the dorsum 118 (e.g., displacement greater than 5 mm) and the tendon 114 (e.g., displacement greater than 10 mm) portions of the user's wrist. Thus, the plots 114, 116, 118, and 120 demonstrate how tissue stiffness can drastically influence an actuator's operation, and the need to create forces of differing magnitudes in order to apply uniform forces to different parts of the body.

Figure 1C:
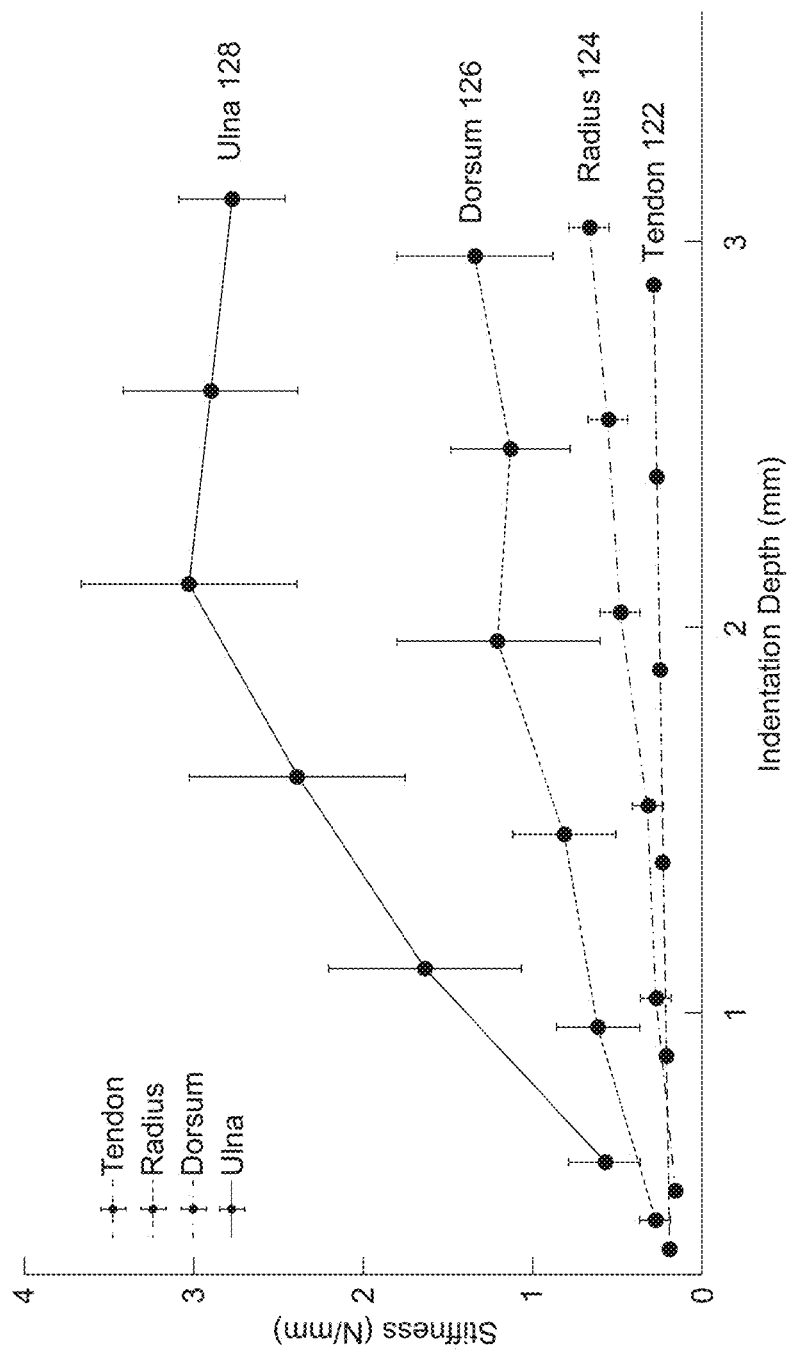
FIG. 1C illustrates a plot of stiffness for various indentation depths for various locations around a user's wrist, according to some embodiments.

FIG. 1C illustrates a stiffness plot for various indentation depths for various locations around a user's wrist, according to some embodiments. The indentation depth is a proxy for the amount of squeeze applied to a user wearing the haptic device. The curves 122, 124, 126, and 128 correspond to the tendon 102-2, the radius 102-4, the dorsum 102-6, and the ulna 102-8 portions of the user's wrist (FIG. 1), respectively.

Apart from differences in vibration perception caused by body tissue differences, in some conventional systems, the entire band vibrates when an actuator is activated due to rigid mounting of the actuator to the band (or housing). This is a significant problem for multi-actuator systems as the vibration created by the activated actuator does not feel localized. To address these issues, the devices discusses herein are capable of tuning a connection between a vibrotactile actuator and its housing. Some embodiments use a technique of impedance shaping for vibrotactile haptic interfaces. In some embodiments, a silicone membrane minimizes the vibration transmitted to the housing of the actuator. In some embodiments, the techniques described herein can help provide a significant reduction (e.g., 5 times reduction) in vibration transmission from the actuator to the housing.

Figure 2A:
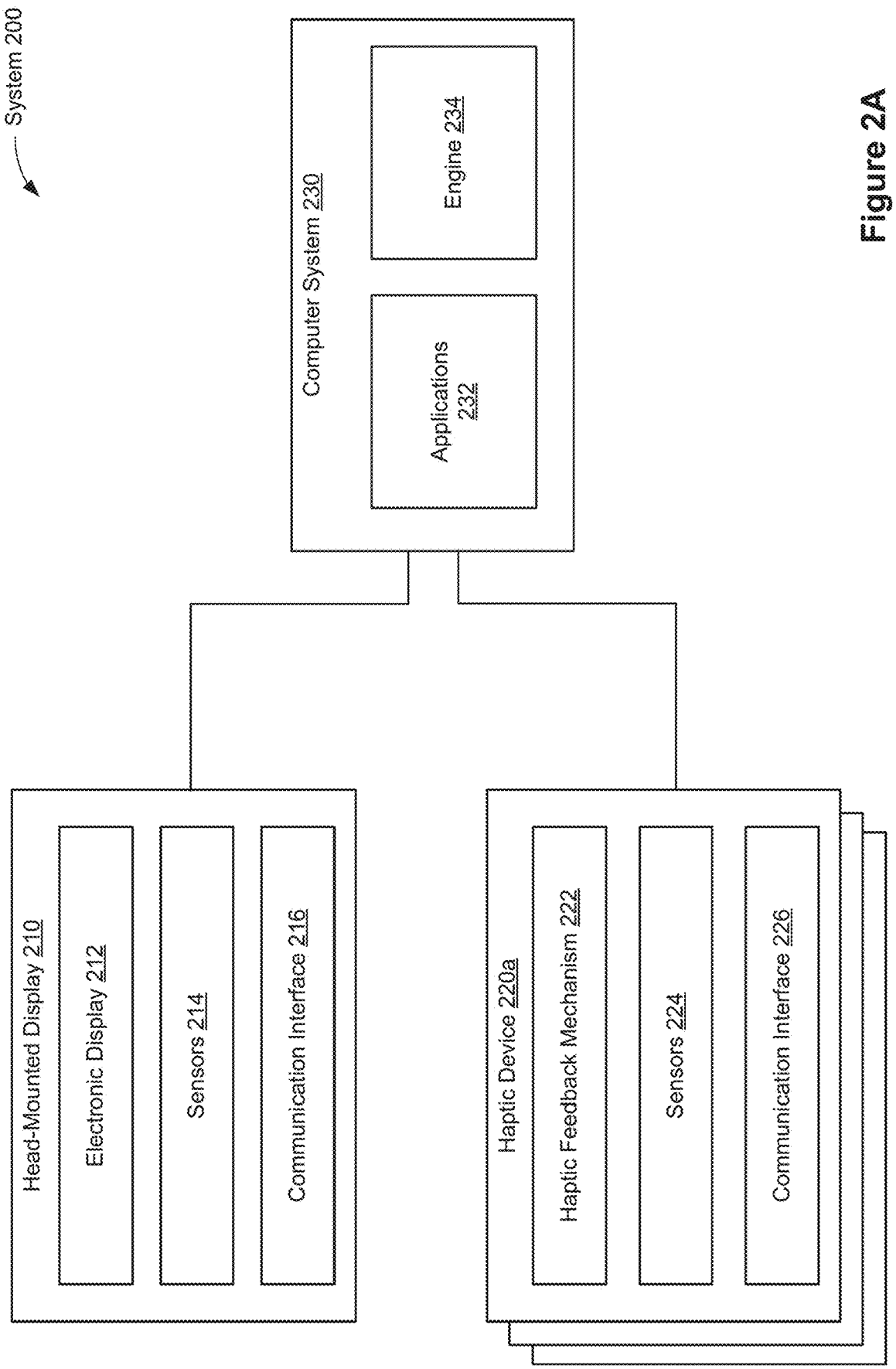
FIG. 2A is a block diagram of a system for synthesizing haptic feedback in artificial-reality environments, according to some embodiments.

FIG. 2A is a block diagram of a system 200 for synthesizing haptic feedback in artificial-reality environments, according to some embodiments. While some example features are illustrated, various other features have not been illustrated for the sake of brevity and so as not to obscure pertinent aspects of the example embodiments disclosed herein. To that end, as a non-limiting example, the system 200 includes one or more haptic devices 220. In some embodiments, the one or more haptic devices 220 are used in conjunction with a computer system 230 (sometimes referred to a "remote computer system" or a "computing device") and/or a head-mounted display 210 (e.g., a virtual-reality headset, an augmented reality system headset, a mixed reality system, or some combination thereof). In some embodiments, the system 200 provides the functionality of a virtual-reality device with haptic feedback, an augmented-reality device with haptic feedback, or a combination thereof.

In some embodiments, the head-mounted display 210 presents media to a user. Examples of media presented by the head-mounted display 210 include images, video, audio, or some combination thereof. In some embodiments, audio is presented via an external device (e.g., speakers and/or headphones) that receives audio information from the head-mounted display 210, the computer system 230, or both, and presents audio data based on the audio information.

In some embodiments, the head-mounted display 210 includes an electronic display 212, sensors 214, a communication interface 216, and/or an audio interface 218. The electronic display 212 displays images to the user in accordance with data received from the computer system 230. In various embodiments, the electronic display 212 may comprise a single electronic display 212 or multiple electronic displays 212 (e.g., one display for each eye of a user).

The sensors 214 include one or more hardware devices that detect spatial and motion information about the head-mounted display 210. Spatial and motion information can include information about the position, orientation, velocity, rotation, and acceleration of the head-mounted display 210. For example, the sensors 214 may include one or more inertial measurement units (IMUs) that detect rotation of the user's head while the user is wearing the head-mounted display 210. This rotation information can then be used (e.g., by the engine 234) to adjust the images displayed on the electronic display 212. In some embodiments, each IMU includes one or more gyroscopes, accelerometers, and/or magnetometers to collect the spatial and motion information. In some embodiments, the sensors 214 include one or more cameras positioned on the head-mounted display 210.

The communication interface 216 enables input and output to the computer system 230. In some embodiments, the communication interface 216 is a single communication channel, such as HDMI, USB, VGA, DVI, or DisplayPort. In other embodiments, the communication interface 216 includes several distinct communication channels operating together or independently. In some embodiments, the communication interface 216 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 214 from the head-mounted display 210 to the computer system 230. In such embodiments, the communication interface 216 may also receive audio/visual data to be rendered on the electronic display 212.

In some embodiments, the haptic device 220 is integrated with a wearable device, which includes a garment worn by the user (e.g., a glove, a shirt, or pants). FIG. 1A (described above) shows an example of a user wearing a wearable device (e.g., around the user's wrist) that includes one or more haptic devices. In other embodiments, the haptic device 220 is integrated with another device, such as a game controller. The haptic device 220 includes a haptic-feedback mechanism 222, sensors 224, and a communication interface 226. In some embodiments, the sensors 224 are used to measure an amount of force applied to the user by the haptic-feedback mechanism 222 (e.g., a vibrotactile actuator). Alternatively or in addition, in some embodiments, the sensors 224 are used to measure tissue stiffness/impedance. Either way, information generated by the sensors 224 can be used to control operation of the haptic-feedback mechanism 222. The haptic device 220 may include additional components that are not shown in FIG. 2A, such as a power source (e.g., an integrated battery, a connection to an external power source, a container containing compressed air, or some combination thereof), one or more processors, and memory. It is noted that the sensors 224 and the haptic-feedback mechanism 222 may be part of the same apparatus, at least in some embodiments.

The haptic device 220 is configured to provide haptic feedback (i.e., haptic stimulations or haptic cues) to the user. To accomplish this, the haptic device 220 includes one or more haptic-feedback mechanism 222 (as mentioned above), which are configured to impart (i.e., deliver, apply) haptic stimulations to a user of the haptic device. As will be explained in greater detail below, the one or more haptic-feedback mechanism 222 are able to create different haptic stimulations by acting alone, or by acting in consort. The haptic device 220 is configured to generate localized vibrations to suit stiffness and/or impedance of a user's tissue site (again, which may be determined by the sensors 224, e.g., during a calibration process when the haptic device 220 is donned by the user).

In some embodiments, the haptic sensors 224 include one or more hardware devices that detect amount of force exerted by haptic-feedback mechanisms 222 and/or stiffness or impedance of tissue site of the user's body (e.g., around a user's wrist as described above in reference to FIG. 1A). In some embodiments, the sensors 224 include feedback sensors (e.g., a laser displacement sensor, a force or pressure sensor, a motor encoder, or a Hall-effect sensor, an accelerometer, or a magnetometer) to configure/reconfigure the haptic device 220. The sensors 224 may also include one or more other sensors that can gather anatomical information about a user (e.g., tissue stiffness), such as displacement sensors, contact sensors, and acoustic sensors.

The haptic communication interface 226 enables input and output to the computer system 230. In some embodiments, the haptic communication interface 226 is a single communication channel, such as USB. In other embodiments, the haptic communication interface 226 includes several distinct communication channels operating together or independently. For example, the communication interface 226 may include separate communication channels for receiving control signals for the haptic-feedback mechanism 222 and sending data from the haptic sensors 224 to the computer system 230. The one or more communication channels of the haptic communication interface 226 can be implemented as wired or wireless connections. In some embodiments, the haptic communication interface 226 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

Figure 2B:
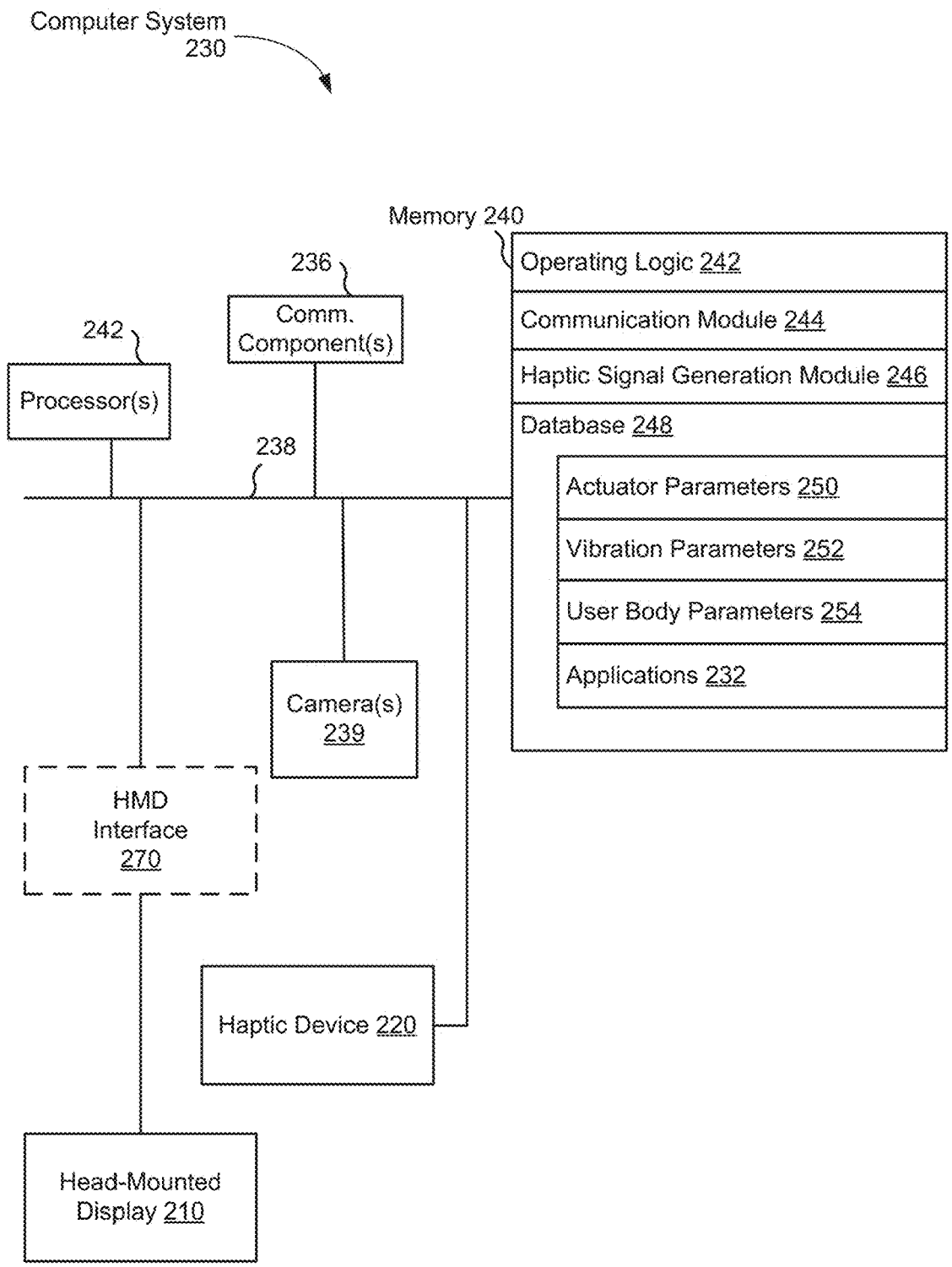
FIG. 2B is a block diagram of a computer system for synthesizing haptic feedback in artificial-reality environments, according to some embodiments.

FIG. 2B is a block diagram of the computer system 230 shown in FIG. 2A, according to some embodiments. In some embodiments, the computer system 230 is a computing device that executes applications 232 (e.g., virtual reality applications, augmented reality applications, mixed reality application, and the like) to process input data from the sensors 214 on the head-mounted display 210 and the haptic sensors 224 on the haptic device 220. In some embodiments, the computer system 230 provides output data for (i) the electronic display 212 on the head-mounted display 210, and/or (ii) the haptic device 220 (e.g., processors of the haptic device 220).

In some embodiments, the computer system 230 sends instructions (e.g., the output data) to the haptic device 220 using a communication interface 236. In response to receiving the instructions, the haptic device 220 creates one or more haptic stimulations (e.g., using the haptic-feedback mechanism 222). Alternatively, in some embodiments, the computer system 230 sends instructions to an external device, such as a wearable device, a game controller, or some other Internet of things (IOT) device, and in response to receiving the instructions, the external device creates one or more haptic stimulations through the haptic device 220 (e.g., the output data bypasses the haptic device 220). Although not shown, in the embodiments that include a distinct external device, the external device may be connected to the head-mounted display 210, the haptic device 220, and/or the computer system 230 via a wired or wireless connection.

The computer system 230 can be implemented as any kind of computing device, such as an integrated system-on-a-chip, a microcontroller, a console, a desktop or laptop computer, a server computer, a tablet, a smart phone, or other mobile device. Thus, the computer system 230 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either a wired or a wireless interface. The I/O interface interfaces the processor to peripherals (not shown) such as, for example and depending upon the computing device, sensors, displays, cameras, color sensors, microphones, keyboards, and USB devices.

In the example shown in FIG. 2B, the computer system 230 includes applications 232 (e.g., virtual-reality applications, augmented-reality applications, mixed-reality application, and/or the like) and an engine 234. In some embodiments, the applications 232 and/or the engine 234 are implemented as software modules that are stored on the storage device and executed by the processor. Some embodiments of the computer system 230 include additional or different components than those described in conjunction with FIG. 2A. Similarly, the functions further described below may be distributed among components of the computer system 230 in a different manner than is described here.

In some embodiments, each application 232 is a group of instructions that, when executed by a processor (e.g., processor(s) 242), generates content for presentation to the user. An application 232 may generate content in response to inputs received from the user via movement of the head-mounted display 210 or the haptic device 220. Examples of applications 232 include gaming applications, conferencing applications, and video playback applications.

In some embodiments, the engine 234 is a software module that allows applications 232 to operate in conjunction with the head-mounted display 210 and/or the haptic device 220. In some embodiments, the engine 234 receives information from the sensors 214 on the head-mounted display 210 and provides the information to an application 232. Based on the received information, the engine 234 determines media content to provide to the head-mounted display 210 for presentation to the user via the electronic display 212 and/or a type of haptic-feedback to be created by the haptic device 220. For example, if the engine 234 receives information from the sensors 214 on the head-mounted display 210 indicating that the user has looked to the left, the engine 234 generates content for the head-mounted display 210 that mirrors the user's movement in a virtual environment. As another example, if the user hits a wall, the engine 234 generates control signals for the haptic-feedback mechanism 222 to generate a strong vibration or a click sound to alert the user.

Similarly, in some embodiments, the engine 234 receives information from the sensors 224 on the haptic device 220 and provides the information to an application 232. The application 232 can use the information to perform an action within the virtual world of the application 232. For example, if the engine 234 receives information from the sensors 224 that the user has raised his hand and hit a wall, a simulated hand in the application 232 lifts to a corresponding height. In some embodiments, the engine 234 generates control signals for the haptic-feedback mechanism 222 to generate a vibration to alert the user. As noted above, the information received by the engine 234 can also include information from the head-mounted display 210. For example, cameras on the head-mounted display 210 may capture movements of the haptic device 220, and the application 232 can use this additional information to perform the action within the virtual world of the application 232.

The engine 234 may also provide feedback to the user that the action was performed. The provided feedback may be visual via the electronic display 212 in the head-mounted display 210 and/or haptic via one or more of the haptic-feedback mechanism 222 in the haptic device 220. For example, if a haptic device 220 is attached to a user's forearm, one or more haptic-feedback mechanisms 222 of the haptic device 220 may create one or more vibratory sensations on the user's forearm to simulate the sensation of an avatar in a virtual-reality video game touching the arm of the user's avatar. To do this, in some embodiments, the haptic device 220 activates one or more haptic-feedback mechanisms 222 based on an instruction from the computer system 230.

As mentioned above, in some embodiments, the haptic stimulations created by the haptic device 220 can correspond to data displayed by the head-mounted display 210 (e.g., an avatar touching the user's avatar). Thus, the haptic device 220 is used to further immerse the user in virtual and/or augmented reality experience such that the user not only sees (at least in some instances) the data on the head-mounted display 210, but the user may also "feel" certain aspects of the displayed data. Moreover, in some embodiments, the haptic device 220 is designed to not restrict movement of the user's body. Consequently, the wearer experiences far less unwanted encumbrances when wearing the haptic device 220, relative to conventional wearable haptic devices. The computer system 230 also has a communication interface 236, which can be used to communicate with the head mounted display 210, the haptic device 220, and/or other devices.

In some embodiments, the computer system 230 includes one or more processing units 242 (e.g., CPUs, microprocessors, and the like), a communication interface 236 (as described above), memory 240, and one or more communication buses 238 for interconnecting these components (sometimes called a chipset). In some embodiments, the computer system 230 includes cameras 239 and/or camera interfaces to communicate with external cameras, internal and/or external audio devices (not shown) for audio responses.

In some embodiments, the memory 240 in the computer system 230 includes high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within memory, includes a non-transitory computer-readable storage medium. In some embodiments, the memory, or the non-transitory computer-readable storage medium of the memory, stores the following programs, modules, and data structures, or a subset or superset thereof:

operating logic 242, including procedures for handling various basic system services and for performing hardware dependent tasks;

a communication module 244, which couples to and/or communicates with remote devices (e.g., the haptic device 220, any audio devices, head-mounted display 210, and/or other wearable devices) in conjunction with the communication components 236;

a haptic signal generation module 246 for generating haptic signals for the haptic devices 220. In some embodiments, the haptic signal generation module 246 receives information (e.g., user body parameters) from one or more sensors (e.g., sensors 224 in the haptic device 220). In some embodiments, the information relates to tissue stiffness (sometimes called tissue biomechanics, stiffness, or impedance). In some embodiments, the haptic signals include parameters for one or more linear actuators, such as a displacement value, calculated based on the information received from the sensors. In some embodiments, the parameters are one or more values, such as an expected or desired tension of the brace attached to the linear actuator. In some embodiments, the haptic signal generation module 246 generates the haptic signals based on the information from the sensors and known (or predetermined) values, such as distance between the linear actuator and the vibrotactile actuator, tensile strength of the brace, vibration frequencies, etc. In some embodiments, the haptic signal also includes vibration parameters for one or more vibrotactile actuators. In some embodiments, the vibration parameters (e.g., frequency of vibration) are computed based on the desired frequency of vibration to produce realistic perception of vibration to the user; and a database 248, which stores:

linear actuator parameters 250 used to define characteristics of one or more linear actuators. In some embodiments, the parameters 250 include displacement values for the one or more linear actuators (e.g., to move along an axis) so as to stretch a brace attached to the actuator. In some embodiments, the parameters 250 include desired stretch or tension of the brace. In some embodiments, the parameters 250 include a distance between a vibrotactile actuator and a linear actuator;

vibration parameters 252 used to define vibration characteristics (e.g., vibration frequency) of one or more vibrotactile actuators;

user body parameters 254 used by the module 246. In some embodiments, the user body parameters 254 are dynamically generated by one or more sensors (e.g., sensors 224) coupled to the haptic device 220. In some embodiments, the user body parameters 254 are precomputed or predetermined based on known physical characteristics of a user; and/or the applications 232 (discussed above).

Figure 3A:
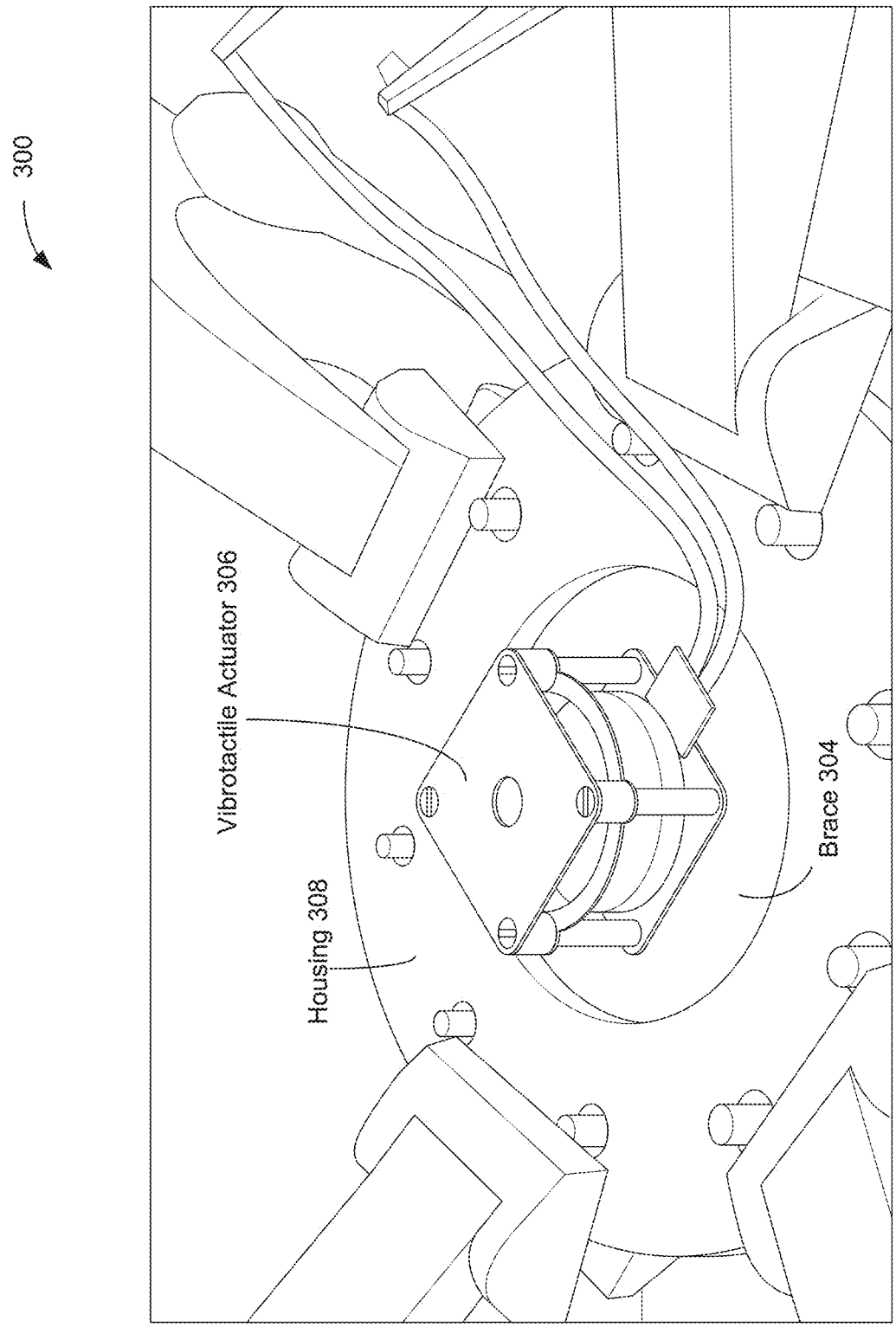
FIG. 3A illustrates an experimental set-up with an actuator surrounded by a membrane and a rigid housing, according to some embodiments.

FIG. 3A illustrates an experimental set-up 300 with a vibrotactile actuator 306 surrounded by an elastic membrane 304 (sometimes called a brace) and a housing 308, according to some embodiments. The vibrotactile actuator 306 may be part of the haptic-feedback mechanism 222. As further described below, in some embodiments, a linear actuator 302 (shown in FIG. 3B) is also included and used to adjust the membrane 304 (e.g., adjust a tension of the membrane 304) to control vibrations of the actuator 306. Like the vibrotactile actuator 306, the linear actuator 302 may also be part of the haptic-feedback mechanism 222.

As just mentioned, the linear actuator 302, while optional, can be used to adjust a tension of the membrane 304. Advantages of adjusting the membrane 304 are two-fold: (i) doing so can help provide a uniform perception of vibrations to the same user (and between users), and (ii) doing so can isolate the vibrations of the actuator 306 from the housing 308, thereby allowing the haptic device 220 to create localized haptic stimulations (e.g., the vibration stimulation is focused at a desired location, such as the tendon 102-2).

Note that the membrane 304 is also configured to help provide a uniform perception of vibrations to the same user (and between users), and also isolate the vibrations of the actuator 306 from the housing 308. For example, the vibrotactile actuator 306 may be configured to apply a haptic stimulation to a user at a target location on the user's body, whereby the target location on the user's body has a known impedance (e.g., the radius, ulna, tendon, and dorsum each has a generally known impedance). In such an example, the membrane may be selected according to the known impedance of the target location, such that one or more mechanical properties of the membrane (e.g., an elasticity of the membrane), complement the known impedance of the target location, in order to tune vibration characteristics of the vibrotactile actuator at the target location. To illustrate, if the known impedance is near the radius, then it is understood that the tissue there is relatively hard compared to, say, the tendon. In such a circumstance, a membrane 304 is selected that suits the tissue near the radius (e.g., the membrane is highly elastic). In contrast, if the known impedance is near the tendon, then it is understood that the tissue there is relatively soft compared to, say, the radius. In such a circumstance, a membrane 304 is selected that suits the tissue near the tender (e.g., the membrane is highly inelastic). The key here is that a membrane 304 for each tissue site can be specifically selected for that particular tissue site so as to help provide a uniform perception of vibrations (and also isolate the vibrations of the actuator 306 from the housing 308).

In practice (and as shown in FIG. 1A), an example haptic device 220 may include multiple actuators 306 with the structure shown in FIG. 3A. In other words, each actuator 306 is suspended by an elastic membrane 304, and is thus vibrationally isolated from the housing 308. In this way, the haptic device 220 can create various haptic stimulations, including numerous localized haptic stimulations as a result of each actuator 306 being suspended by an elastic membrane 304. It is noted that the membrane 304 may be made from various elastic polymers, including a variety of unsaturated and saturated rubbers (e.g., silicone), which again, may be selected for particular tissue sites.

Figure 3B:
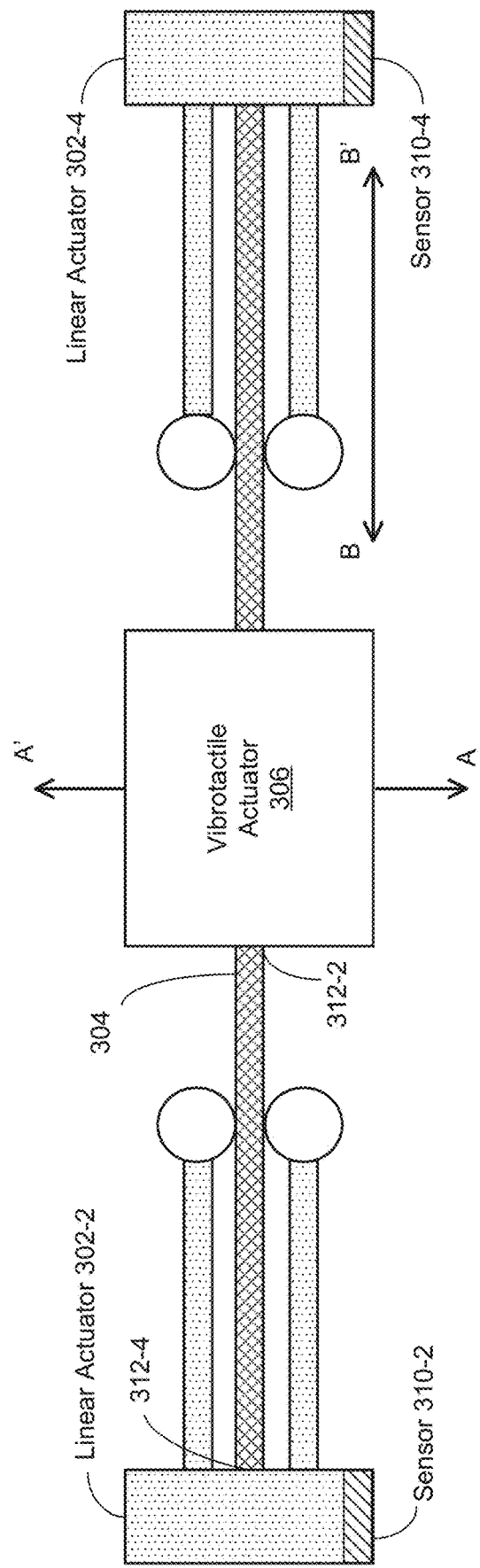
FIG. 3B illustrates a cross-sectional view of an example tunable respective haptic device in a first state, according to some embodiments.
Figure 3C:
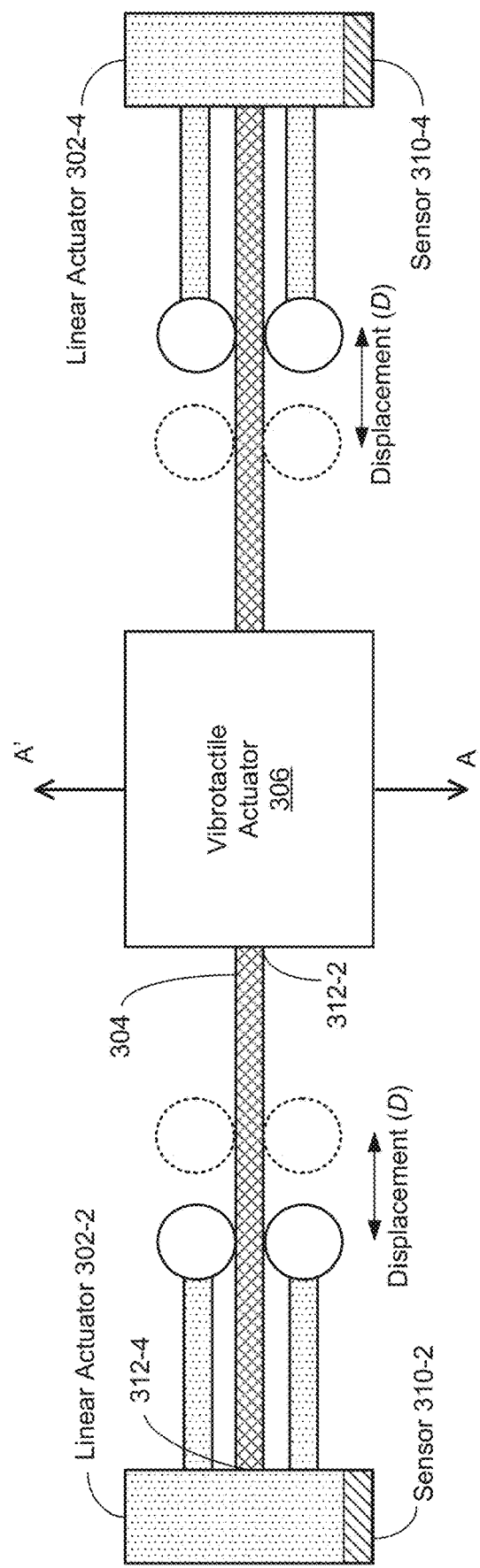
FIG. 3C illustrates another cross-sectional view of the example tunable respective haptic device in a second state, according to some embodiments.

FIG. 3B illustrates a schematic diagram for tuning an actuator 306, according to some embodiments. The actuator 306 can be tuned by changing the tension and/or the radius of the membrane 304, either of which changes the vibration characteristics of the vibrotactile actuator 306, and even the vibration characteristics of the housing 308. Some embodiments use data from one or more sensors 310-2, 310-4, which are examples of sensors 224, to tune the vibration characteristics of the actuator 306 at a particular location. In some embodiments, the sensors 310 are placed between the linear actuator (e.g., the actuator 302-2 and/or the actuator 302-4) and a user's tissue site (e.g., the dorsum 102-6, etc.). Alternatively or in addition, in some embodiments, the sensors 310 are placed between the actuator 306 and the user's tissue site. It is noted that adjusting the "radius" of the membrane 304 involves one or more linear actuators moving closer to or farther away from the vibrotactile actuator 306, as shown in FIGS. 3B and 3C. As a result of the moving in FIGS. 3B and 3C, a lesser portion of the membrane 304 is radially constrained by the one or more linear actuators, thereby providing greater mobility to the vibrotactile actuator 306 (e.g., it is easier to move along axis A-A').

In light of the principles discussed above, some specific embodiments are described below.

In accordance with some embodiments, an apparatus is provided that creates haptic stimulations. The apparatus is an example of the haptic-feedback mechanism 222 and is sometimes referred to herein as a haptic assembly. The apparatus includes a brace (e.g., membrane 304) having a first portion and a second portion. The apparatus also includes a vibrotactile actuator 306 coupled to the first portion of the brace (e.g., the first portion 312-2 of the brace 304). The vibrotactile actuator 306 is configured to apply a haptic stimulation to a user. In some embodiments, the apparatus also includes a linear actuator 302 (e.g., the linear actuator 302-2), coupled to the second portion of the brace (e.g., the second portion 312-4 of the brace 304). The linear actuator 302 may be configured to: (i) obtain a signal generated based on information about the user's body at a target location of the user (e.g., information, such tissue stiffness and impedance, about one of the locations on a user's wrist described above in reference to FIGS. 1A-1C); and (ii) adjust the brace according to the signal.

In some embodiments, the vibrotactile actuator 306 is configured to vibrate (e.g., along the axis A-A') over a target tissue site (e.g., tendon 102-2, radius 102-4, dorsum 102-6, or ulna 102-8, FIG. 1A). In some embodiments, the brace is configured to return the vibrotactile actuator 306 to an equilibrium/default position when the vibrotactile actuator 306 is not vibrating. For example, in FIG. 3B, the vibrotactile actuator 306 is positioned at the equilibrium/default position. As mentioned above, the brace (e.g., membrane 304) may be selected according to a known impedance/stiffness of the target tissue site.

In some embodiments, the apparatus further includes (or is in communication with) one or more sensors (e.g., sensors 224, FIG. 2A), coupled to the linear actuator (and/or the vibrotactile actuator 306, or some other structure), configured to generate the information about the user's body at the target location. For example, in FIG. 3B, the sensor 310-2 is attached to the bottom of the linear actuator 302-2, and the sensor 310-4 is attached to the bottom of the linear actuator 302-4. In other words, the one or more sensors sit between the linear actuator and the target tissue site. In some embodiments, more than one sensor is coupled to each linear actuator. In some embodiments, the sensors are not coupled to the linear actuators, and are rather coupled to the brace, vibrotactile actuator 306, and/or the housing 308. Although FIG. 3B shows a sensor attached to each linear actuator, in some embodiments, only one of the linear actuators includes a sensor coupled thereto, and information generated by the single sensor is used to control operation of the linear actuators of the apparatus. For example, the sensor 310-2 (coupled to the linear actuator 302-2) is configured to generate the information about the user's body at a first target location, and the information is used to control the operation of another linear actuator 302-4. Moreover, in some embodiments, the apparatus includes a single linear actuator, while in other embodiments, the apparatus includes multiple linear actuators, as shown in FIGS. 3B and 3C.

In some embodiments, a controller is configured to: (i) generate the signal based on the information about the user's body at the target location generated by the one or more sensors, and (ii) provide the signal to the linear actuator. In some embodiments, the controller is part of the apparatus, and the controller is communicatively coupled to the linear actuator and/or the vibrotactile actuator. For example, the sensor 310-2 generates information about the user's body and transmits the information to a controller, which is then configured to process the information, generate a signal using the processed information, and provide the signal to the linear actuator 302-2.

Example control strategies for the haptic devices discussed herein are shown in FIGS. 5A and 5B. In FIGS. 5A and 5B, a motor and housing component 504 (sometimes called the actuator or the vibrotactile actuator) is coupled to a power supply 502. An interface material 506 is positioned between the actuator 504 and a tissue 514 of a user. During operation, sensor output 508 from the actuator 504 is input to a material impedance controller 512.

In FIG. 5A, the example control strategy involves changing a state of the actuator 504 and using sampled tissue impedances, by the material impedance controller 512, to update the state of the actuator 504, via the impedance change input 510. In FIG. 5B, the example control strategy involves changing, by the material impedance controller 512, and via the impedance change input 510, a state of the interface material 506, such as the interface materials discussed with reference to FIGS. 6D and 6E. It is noted that the control strategies in FIGS. 5A and 5B can be combined, at least in some embodiments.

In some embodiments, an open-loop control strategy is used that is based on estimated tissue impedance and transmission quality requirement. In such embodiments, the actuators are set to a specific mechanical impedance state at the beginning of each session (e.g., after calibration) to vibrate with a certain output mechanical impedance that is optimal for the target location (i.e., a portion of the body to which the actuators are coupled to). During operation, if a sudden change in transmission quality of the vibration is required, the state of a respective actuator can be changed by tuning the mechanical impedance of the respective actuator (i.e., the transmission of vibration can be improved by changing the mechanical impedance of the actuator (and/or the interface material)).

In some embodiments, a closed-loop control strategy is implemented that adapts to tissue impedance. In such embodiments, by estimating the tissue and actuator impedance, the impedance of the actuator, the interface material, and the tissue (by changing the preload force) can be changed to match or mismatch impedances. In doing so, the haptic devices herein can adapt the haptic vibration signal to changing tissue impedance as a result of changing mechanical impedance of tissue under different conditions, such as different poses of the body, or as a function of interaction of the body with objects and the environment.

In some embodiments, the linear actuator is communicatively coupled to the one or more sensors. For example, the linear actuator 302-2 may be communicatively coupled, but not necessarily physically coupled, to the sensor 310-2. In such embodiments, the one or more sensors may be configured to generate the signal based on the information about the user's body at the target location. Moreover, the linear actuator may be configured to obtain the signal from the one or more sensors (i.e., in such embodiments, the controller is bypassed) and operate based on the signal.

In some embodiments, the one or more sensors are configured to generate signals (data) during use and/or during a calibration process. For example, the one or more sensors (such as force, displacement, contact or acoustic sensors) are used to estimate an anatomical location of the actuators on the user's body. In doing so, a performance of the actuators can be tailored/adapted to the anatomical location (i.e., tailored to a target location).

In those embodiments where the one or more sensors generate the signal, the one or more sensors may be configured to generate the signal based on information about a stiffness and/or mechanical impedance of a tissue site of the user. In some embodiments, the information about the user's body at the target location includes biomechanics of a tissue (e.g., biomechanical stiffness, impedance) of the user's body at the target location.

In some embodiments, adjusting the brace involves adjusting the tension of the brace, which tunes vibration characteristics of the apparatus by minimizing vibrations transmitted from the vibrotactile actuator to the linear actuator (and, in turn, the housing). To accomplish this, at least in some embodiments, the linear actuator may be configured to stretch (e.g., by pulling) the brace 304 along the axis B-B' (FIG. 3B) to adjust the tension of the brace 304. In this way, the linear actuator strains the brace 304, such that when the vibrotactile actuator 306 vibrates (along the axis A-A'), the tension/strain in the brace 304 pulls (or attempts to pull) the vibrotactile actuator 306 back to its equilibrium position. Thus, adjusting the tension of the brace may cause absorption of vibrations transmitted from the vibrotactile actuator 306 to the linear actuator 302-4 (and, in turn, the housing 308). In some embodiments, adjusting the tension of the brace helps control the overall vibration of the apparatus.

In some embodiments, the linear actuator is configured to adjust a radius of the brace in order to tune vibration characteristics of the apparatus (i.e., adjust a percentage of the brace that is free to move along the axis A-A'). For example, the linear actuator 302-4 shifts (or slides) along the axis B-B' away from the vibrotactile actuator 306, as shown by the transition from FIG. 3B to FIG. 3C. This linear movement adjusts the radius (or length) of the brace, which in turn adjusts the ability of the brace, and also the vibrotactile actuator 306, to move along the axis A-A'. To further illustrate, in FIG. 3B, the arms of the linear actuators 302-2, 302-4 are extended further toward the vibrotactile actuator 306 (relative to the arms of the linear actuators 302-2, 302-4 in FIG. 3C), and, consequently, a small radius of the brace is free to move along the axis A-A'. In contrast, in FIG. 3C, the arms of the linear actuators 302-2, 302-4 are retracted further toward the linear actuators (as indicated by Displacement (D) in FIG. 3C), and, consequently, a large radius of the brace is free to move along the axis A-A'.

In some embodiments, the vibrotactile actuator is configured to move in one or more first directions, the linear actuator is configured to move in one or more second directions, and the one or more first directions are different from the one or more second directions (e.g., they are perpendicular to each other). For example, in FIG. 3B, the vibrotactile actuator is configured to vibrate along the axis A-A' that is substantially perpendicular to the axis B-B'.

In some embodiments, the brace is an elastic membrane, such as a silicone membrane. In some other embodiments, the brace is a spring.

In some embodiments, the linear actuator is configured to adjust the brace to (i) account for variations in tissue biomechanics at the target location and/or (ii) provide a uniform perception of vibration to the user. For example, when a user wears the apparatus (as part of a wearable device, such a wrist-worn band), the tissue site location (sometimes called the target location) that aligns with the vibrotactile actuator has a corresponding tissue biomechanics or stiffness profile (which can be sensed apriori or dynamically using one or more sensors). When the profile of the tissue biomechanics changes (e.g., as detected by a sensor) at the target location, the linear actuator is configured to adjust the tension of the brace to account for the change at the target location. By dynamically adjusting the profile, the linear actuator can provide a uniform perception of vibration to the user. A number of reasons could contribute to the change in tissue biomechanics at the target location. For example, when a first user initially wears the wearable device, the position of the vibrotactile actuator and/or the apparatus may align with a first tissue location. Subsequently, either due to vibrations (that cause the device to shift or move) or because the first user manually adjusts the position of the wearable device, the position of the vibrotactile actuator and/or the apparatus may become aligned with a second tissue location, distinct from the first tissue location. Such an adjustment would warrant adjustment of the brace. As another example, when a second user distinct from the first user (e.g., the first user is physically stronger compared to the second user) wears the wearable device subsequent to the first user, the tissue biomechanics at the target location are likely to change because each user has a unique stiffness profile.

In some embodiments, the linear actuator is further configured to account for a squeeze (or a tensioning force) applied when the first user wears the haptic device. For example, suppose the apparatus is part of a wearable device and linked to other similar apparatuses, or the apparatus is part of a haptic assembly and a plurality of such haptic assemblies are connected to a wearable structure (e.g., a wrist band, such as the arrangement shown in FIG. 1A). When the user wears the wearable device, the connection (e.g., links to/from the linear actuator) between the apparatus and other similar apparatus exerts a tensioning force (e.g., an outwardly pull or a radial pull around a user's wrist) on the linear actuator. The linear actuator is configured to account for this counteracting force (acting against the pull from the brace) when adjusting the tension of the brace. It is noted that the one or more sensors may be used to measure the amount of squeeze.

In some embodiments, the apparatus further includes a housing that at least partially houses the vibrotactile actuator, the linear actuator, and the brace. For example, FIG. 3A shows a housing 308 that is attached to one or more linear actuators and houses the brace 304 (e.g., to keep the brace in its position).

In some embodiments, the vibrotactile actuator is suspended by the brace. For example, in FIG. 3A, the vibrotactile actuator 306 is shown to be suspended by the brace 304. Moreover, the brace may have various configurations, other than the annular configuration of the brace illustrated in FIG. 3A. In some embodiments, the brace is a membrane that is triangle-shaped (or rectangle-shaped) with an opening for the vibrotactile actuator.

In some embodiments, the linear actuator is communicatively coupled to a computing device. Furthermore, the linear actuator is configured to obtain the signal from the computing device, and the computing device is configured to: (i) generate the signal based on the information about the user's body at the target location; and (ii) provide the signal to the linear actuator. An example of the computer device (the computer system 230) is described above in reference to the FIGS. 2A and 2B, according to some embodiments. The computer system 230, for example, includes a haptic generation module 246 to generate the signal based on information about a user's body. In some embodiments, the signal includes parameters for the linear actuator, such as an amount of displacement necessary to adjust the tension of the brace. In other embodiments, the signal causes the linear actuator to move some displacement distance, as shown in FIGS. 3B and 3C (e.g., in FIG. 3C, the linear actuators 302-2 and 302-4 is displaced outwards away from the vibrotactile actuator 306, according to a control signal). The computer system 230 provides the signal to the haptic device 220 via the communication bus 238, according to some embodiments.

In some embodiments, the vibrotactile actuator is communicatively coupled to the computing device, and the vibrotactile actuator is further configured to: (i) receive vibration parameters from the computing device; and (ii) actuate based on the vibration parameters to apply the haptic stimulation to the user. In some embodiments, the computing device generates haptic signals that includes parameters for the vibrotactile actuator, such as a desired (or computed) frequency of vibration. In some embodiments, the computing device computes the desired frequency of vibration based on factors (e.g., a tissue stiffness at the target location), so as to match content (e.g., an artificial-reality content) displayed on a head mounted display (e.g., the display 210) coupled to the computing device (FIG. 2A).

In another aspect, a wearable device is provided, according to some embodiments. The wearable device includes a wearable structure to be worn on a portion of a user's body. The wearable device also includes a plurality of haptic assemblies. Each haptic assembly is coupled to the wearable structure. Each haptic assembly includes a brace having a first portion and a second portion, a vibrotactile actuator, coupled to the first portion of the respective brace, configured to generate a haptic stimulation to a user, and a linear actuator coupled to the second portion of the respective brace. The linear actuator is configured to: (i) obtain a signal generated based on information about the user's body at a target location of the user, and (ii) adjust the respective brace according to the signal, thereby generating localized vibrations to the user.

In some embodiments, the wearable structure is a wrist-worn band that houses the plurality of haptic assemblies. FIG. 1A illustrates an example wearable device that a user can wear around a wrist. The example illustrated shows several haptic devices connected (or stringed) together using a wearable structure (e.g., a wrist-worn band).

In some embodiments, each brace (or each corresponding haptic assembly) is configured to improve power efficiency of the wearable device by generating the localized vibrations. For example, a first brace is configured so that the vibration perceived by the user at a first location corresponds to a first frequency, and a second brace is configured so that the vibration perceived by the user at a second location corresponding to a second frequency that is lower than the first frequency. By tailoring the vibration frequency to individual target locations, the power consumption of the wearable device is reduced.

In some embodiments, a first haptic assembly of the plurality of haptic assemblies is configured according to biomechanics of a tissue of the user at a first target location. A second haptic assembly, distinct from the first haptic assembly, of the plurality of haptic assemblies is configured according to biomechanics of a tissue of the user at a second target location, distinct from the first target location. For example, for the configuration shown in FIG. 1A, suppose a first haptic assembly corresponds to a first location (say the tendon 102-2) and a second haptic assembly corresponds to a second location (say the radius 102-4). The first haptic assembly is configured according to the biomechanics of the tissue at the tendon, while the second haptic assembly is configured according to the biomechanics of the tissue at the radius. To further illustrate, the tissue site near the tendon is softer than the tissue site near the radius, and, consequently, the tension in the brace (corresponding to the first haptic assembly) is increased. On the other hand, the tissue site near the radius is relatively harder (compared to the tendon), and because of this, the tension in the brace (corresponding to the second haptic assembly) is decreased. Some embodiments maintain relative tension values for the respective braces, rather than absolute values, so as to provide a sense of uniform vibration (around the wrist) to the user.

In some embodiments, the first haptic assembly is positioned to be worn near the first target location and the second haptic assembly is positioned to be worn near the second target location. To illustrate, for the configuration in FIG. 1A, when a user wears the wearable device, a first haptic assembly is positioned such that it aligns with a first target location (say the tendon 102-2), a second haptic assembly is positioned such that it aligns with a second target location (say the radius 102-4), and so on.

In some embodiments, the wearable structure is configured to be worn by the user by applying a tensioning force or a squeeze about an anatomical cross-section of the user's body (e.g., a wrist).

In some embodiments, each vibrotactile actuator is communicatively coupled to a computing device. Each vibrotactile actuator (corresponding to a respective haptic device) is configured to vibrate at a respective frequency in response to receiving one or more signals from the computing device. An example computing device is described above in reference to FIGS. 2A and 2B, according to some embodiments. The computer system 230 may, for example, generate haptic signals that cause the vibrotactile actuator to vibrate in accordance with vibration parameters determined by the computer system 230. As mentioned above, the vibration parameters may be based on information collected by sensors of the wearable device.

Figure 4:
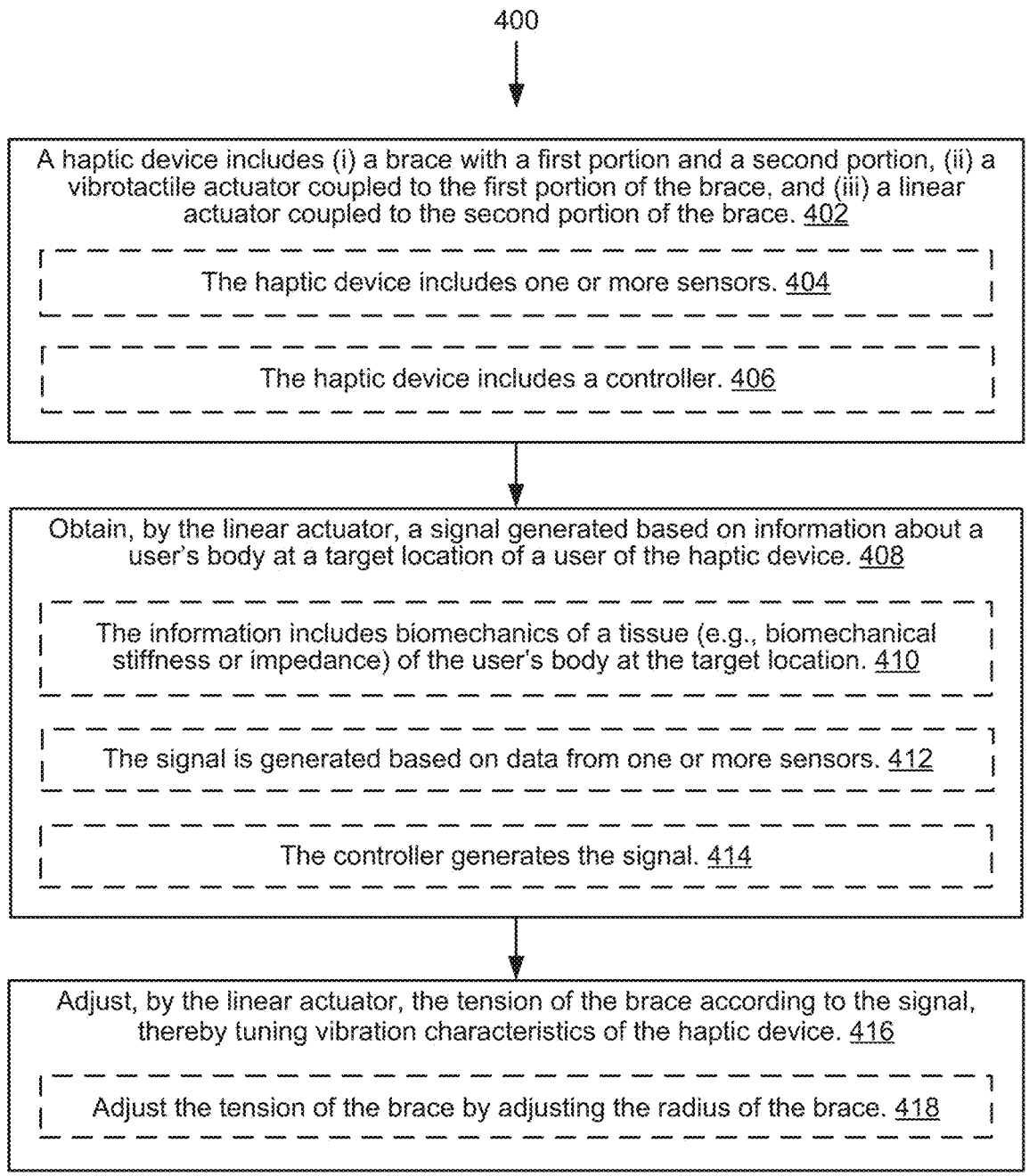
FIG. 4 provides a flowchart of a method of isolating vibrations for haptic devices for artificial-reality environments, according to some embodiments.

FIG. 4 provides a flowchart of a method 400 of isolating (or localizing) vibrations for haptic devices for artificial-reality environments, according to some embodiments. The method 400 is performed (402) at a haptic device (e.g., the apparatus described above in reference to FIG. 3B) that includes: (i) a brace (e.g., the brace 304) with a first portion (e.g., the portion 312-2) and a second portion (e.g., the portion 312-4), (ii) a vibrotactile actuator (e.g., the actuator 306) coupled to the first portion of the brace, and (iii) a linear actuator (e.g., the actuator 302-2) coupled to the second portion of the brace. In some embodiments, the haptic device further includes (404) one or more sensors (e.g., the sensors 310-2 and/or 310-4). In some embodiments, the haptic device further includes (406) a controller that generates signals for the linear actuator based on data from the one or more sensors.

The method 400 includes obtaining (408), by the linear actuator, a signal generated based on information about a user's body at a target location (i.e., a user of the haptic device). In some embodiments, the information includes (410) biomechanics of a tissue (e.g., biomechanical stiffness, impedance) of the user's body at the target location. In some embodiments, the method further includes, at the haptic device, generating (412) the signal based on data from one or more sensors. In some embodiments, the signal is generated (414) by the controller.

The method 400 also includes adjusting (416), by the linear actuator, the tension of the brace according to the signal, thereby tuning vibration characteristics of the haptic device. In some embodiments, adjusting the tension of the brace includes stretching the brace along the longest dimension of the brace. Adjusting the tension of the brace is discussed in further detail above with reference to FIGS. 3B-3C.

Alternatively, in some embodiments, the method 400 includes adjusting the brace according to a signal to tune vibration characteristics of the haptic device. In such embodiments, the linear actuator may be moved (i.e., displaced) according to the signal, which in turn causes the radius of the brace to be adjusted. Note that in some instances, adjusting the radius of the brace also adjusts the tension of the brace.

In some embodiments, the method 400 includes activating the vibrotactile actuator after adjusting the brace. In some embodiments, activating the vibrotactile actuator first involves generating a drive signal based on information about the user's body at the target location, and sending the drive signal to the vibrotactile actuator, which drives (activates) the vibrotactile actuator. It is also noted that the drive signal may also be based on media presented by a head-mounted display 210.

Figure 6A:
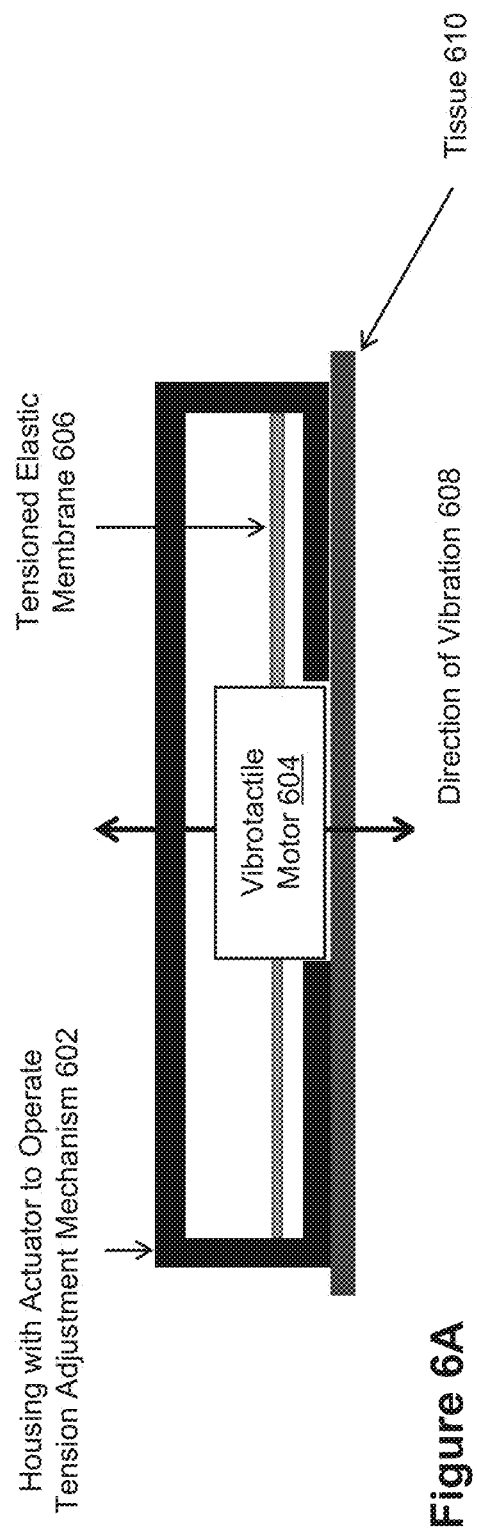
Figure 6B:
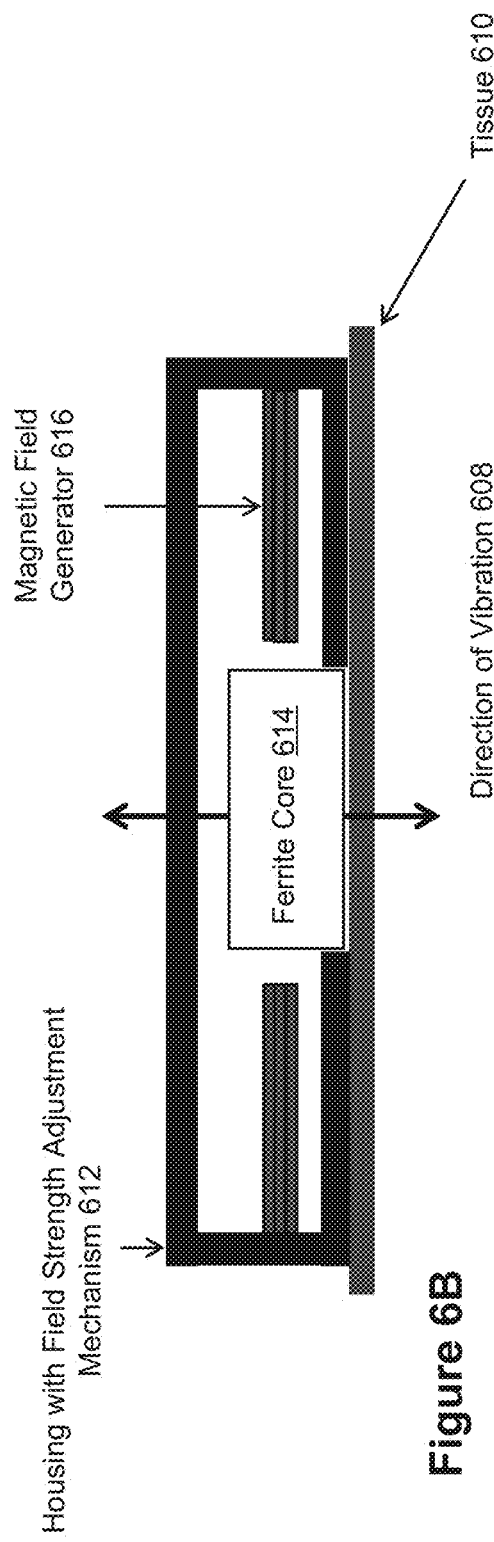
Figure 6C:
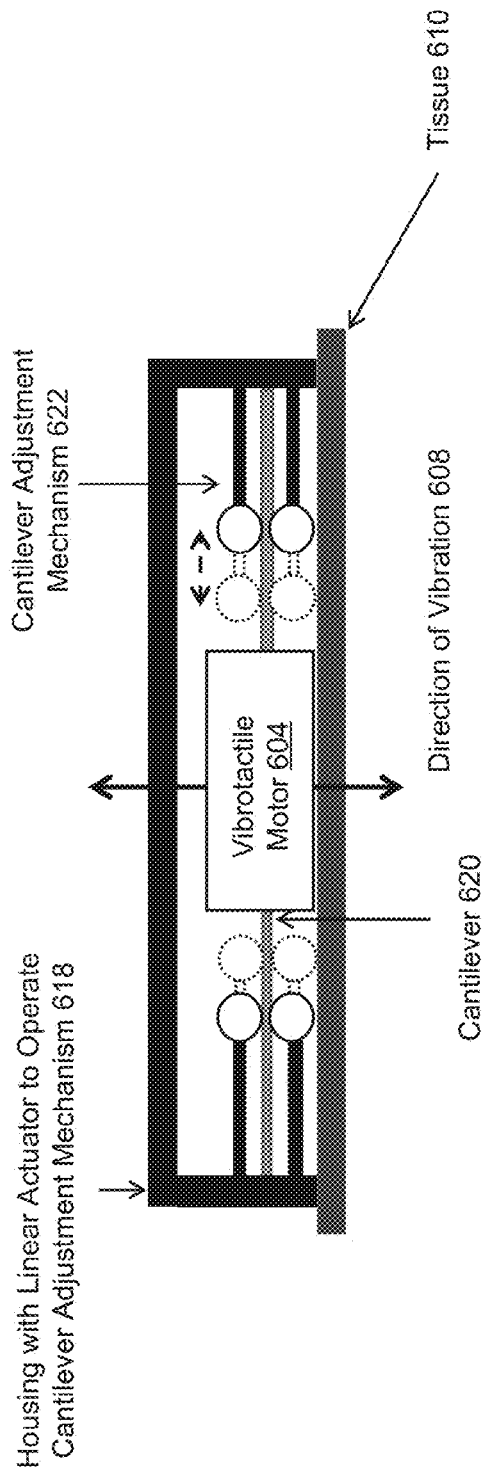
Figure 6D:
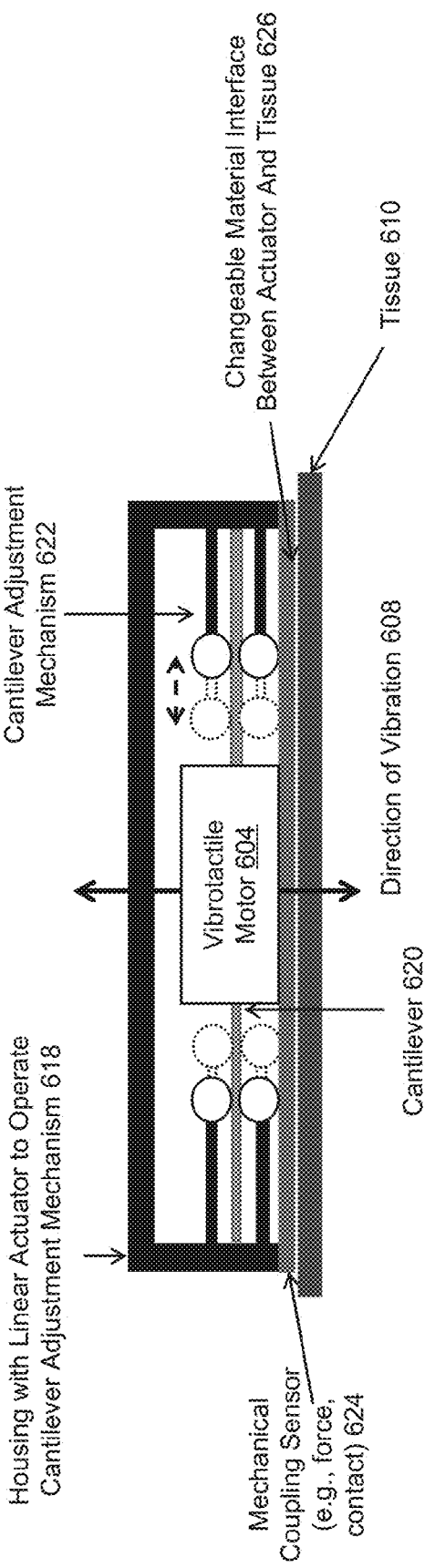
Figure 6G:
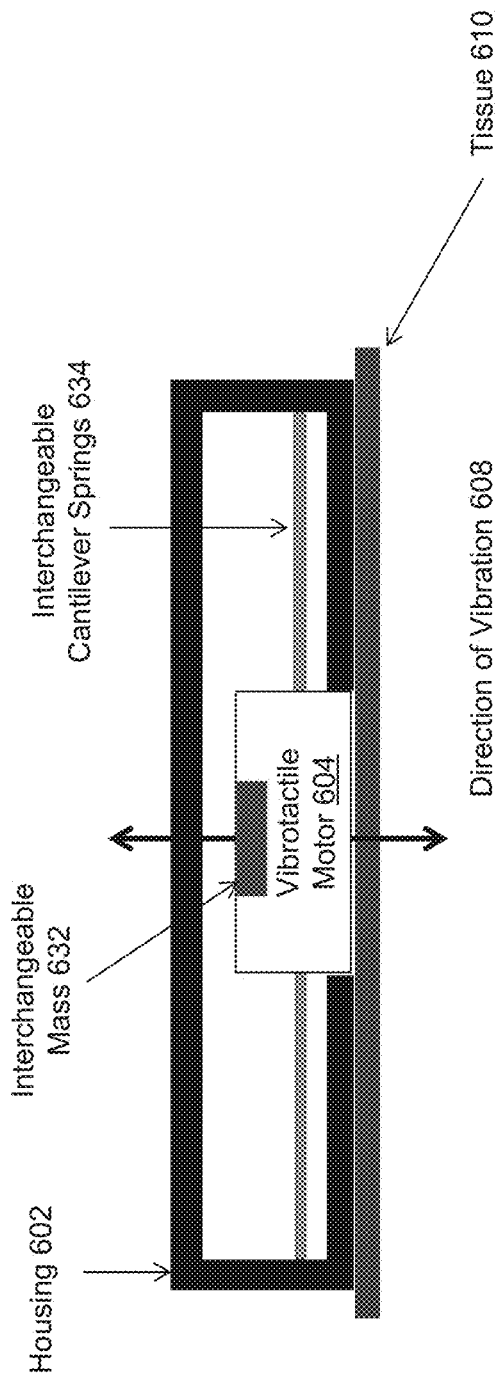

FIGS. 6A through 6G show additional examples of tunable haptic devices. In particular, the examples below demonstrate impedance shaping (referred to below as "z-shaping" due to the illustrated direction of vibration) for haptic actuators to tune the behavior of the haptic actuator-tissue system. It is noted that z-shaping can be achieved through many different means, such as using changeable springs and different actuators and/or housings (e.g., actuators and housings with different masses), as shown in FIG. 6G. As shown in FIG. 6G, by changing the mass (e.g., interchangeable mass 632) and springs (e.g., interchangeable cantilever springs 634), some embodiments change the output impedance of the actuator to match the measured tissue mechanical impedance. Z-shaping can also involve tuning the actuator by using an elastic membrane with a tensioning mechanism (as discussed in detail above). By changing the tension on the elastic membrane, some embodiments change the mechanical output impedance of the actuator to match the tissue mechanical impedance. FIG. 6A shows another example of z-shaping that involves tuning an actuator 604 (sometimes called a vibrotactile motor or a vibrotactile actuator) using an elastic membrane 606 (sometimes called a tensioned elastic membrane) with a tensioning mechanism. For example, in FIG. 6A, a housing 602 that at least partially houses the actuator 604 operates as the tension adjustment mechanism (sometimes called the tensioning mechanism).

FIG. 6B shows alternative means for z-shaping an actuator by using an electromotive force to generate a force field. In such embodiments, changing the voltage applied to a solenoid with a ferrite core causes an output mechanical impedance from the actuator to match the tissue mechanical impedance. For example, FIG. 6B shows a ferrite core 614 housed in a housing 612 with a field strength adjustment mechanism. A magnetic field generator 616 changes or controls voltage applied to a solenoid with the ferrite core 614 that causes an output mechanical impedance from the ferrite core 614 to match the tissue mechanical impedance of tissue 610, when the ferrite core 614 oscillates or vibrates (in direction of vibration 608 that is substantially perpendicular to tissue 810).

FIG. 6C shows alternative means for z-shaping an actuator by changing the length of a cantilever/brace. This alternative means is similar to the approaches discussed above with reference to FIGS. 3B and 3C. FIG. 6C shows the vibrotactile motor 604 at least partially housed in a housing 618 with a linear actuator to operate cantilever adjustment mechanism 622 that controls (e.g., changes length of) cantilever 620. Changing or adjusting the length of the cantilever 620 causes an output mechanical impedance from the vibrotactile motor 604 to match the tissue mechanical impedance of the tissue 610. In some embodiments, a combination of the structures shown in FIGS. 6A, 6B, 6C, and 6G is utilized to achieve z-shaping.

FIGS. 6D and 6E show embodiments that involve optimizing an interface material positioned between the actuator and tissue to maximize the vibrotactile transmission to a user. In particular, FIG. 6D shows an embodiment that involves selecting and positioning optimal interface materials (e.g., changeable material interface 626) between actuator (e.g., the vibrotactile actuator 604) and tissue (e.g., the tissue 610). In such embodiments, different interface materials are selected to transmit vibrations between the actuator and tissue to match mechanical impedance between different anatomical locations, which is accomplished (in part) by quantifying the output mechanical impedance of the actuator and the tissue mechanical impedance. It is noted that embodiments involving optimal interface materials can be combined with any of the structures discussed herein (e.g., the structures shown in FIGS. 6A-6C).

It is also noted that z-shaping can be used to design interface materials with phase changing behavior at different frequencies. In other words, the designed interface materials are passive materials that demonstrate different mechanical impedance properties as a function of the frequency of vibrotactile stimuli. The design for this material is based on the tissue and actuator impedance.

FIG. 6E shows an alternative embodiment that involves using z-shaping to change an impedance of an interface material based on preload, anatomical location, and/or frequency. Such embodiments utilize a fluidic interface material (e.g., fluidic controlled material interface 628) to change the material impedance (e.g., by adding or removing fluid from the interface material). In some embodiments, rheological fluids are used, whereby a voltage driving the electric or magnetic field is used to change the mechanical impedance of the interface material.

FIG. 6F shows another example of sensing of mechanical impedance in a wearable form factor. In this example, the actuator 604 is configured to provide sensor outputs, such as force, contact, displacement measurements to estimate the mechanical impedance of the actuator. To accomplish this, an interface between the tissue and the actuator includes one or more sensors (e.g., mechanical coupling sensor 624) that are configured to sense signals, such as force, acoustic frequency, and amplitude to estimate tissue mechanical impedance.

Figure 7:
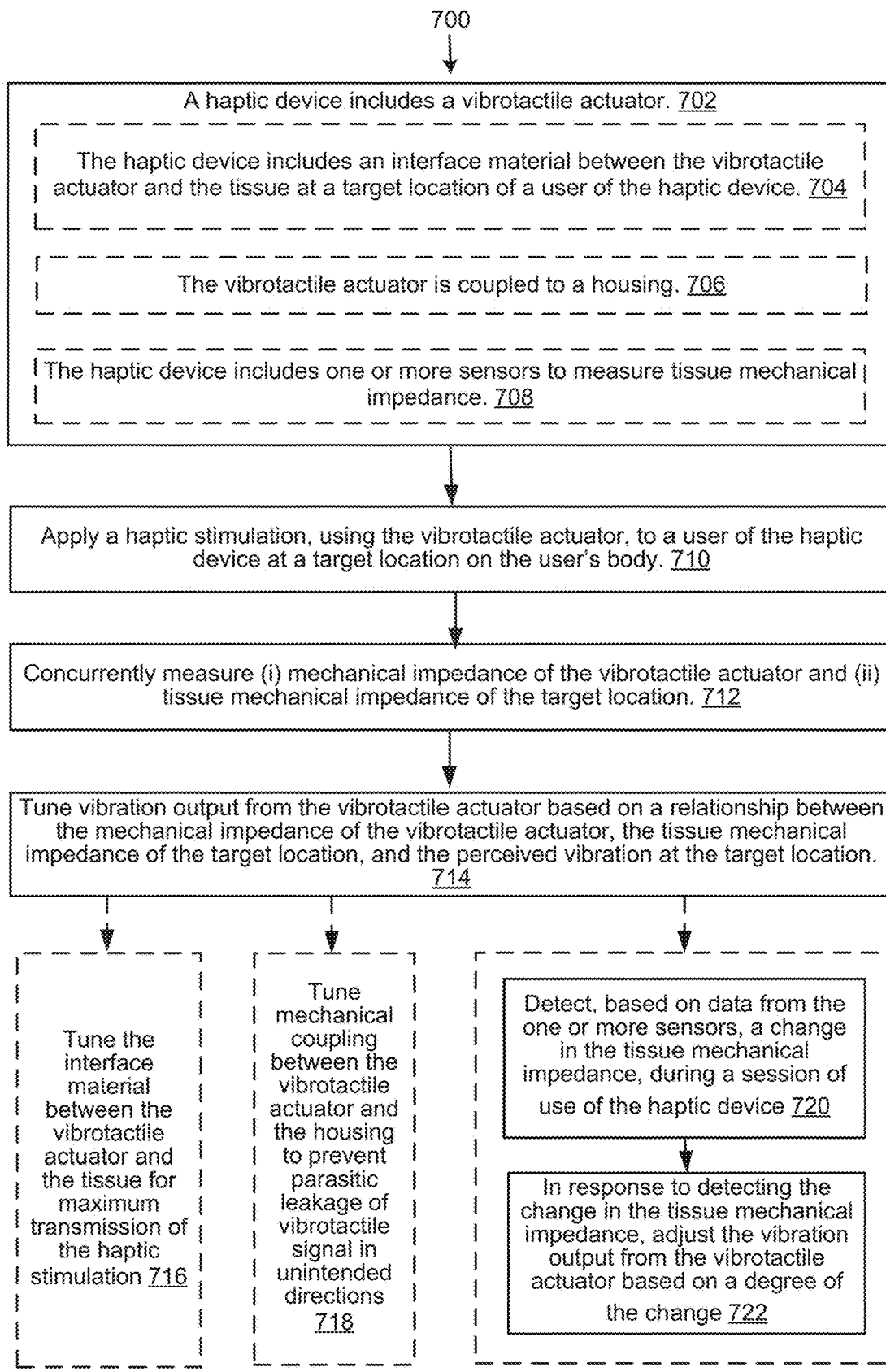
FIG. 7 provides a flowchart of a method of optimizing haptic throughput efficiency and consistency, according to some embodiments.

FIG. 7 provides a flowchart of a method 700 of optimizing haptic throughput efficiency and consistency, according to some embodiments. The method 700 is performed (702) at a haptic device (e.g., the apparatus described above in reference to FIG. 3B) that includes a vibrotactile actuator (e.g., the actuator 306, the vibrotactile motor 604). In some embodiments, the haptic device further includes (704) an interface material (e.g., the interface material 506, the interface material 626) between the vibrotactile actuator and a tissue at a target location of a user of the haptic device. In some embodiments, the vibrotactile actuator is coupled (706) to a housing (e.g., the housing 602). In some embodiments, the haptic device also includes (708) one or more sensors (e.g., the sensors 624) to measure tissue mechanical impedance.

The method 700 includes applying (710) a haptic stimulation, using the vibrotactile actuator, to a user of the haptic device at a target location on the user's body. Examples of applying haptic stimulations are discussed above in the context of the haptic device 220, according to some embodiments.

The method 700 also includes concurrently measuring (712) (i) mechanical impedance of the vibrotactile actuator and (ii) tissue mechanical impedance of the target location. For example, the sensors 224 or the sensors 624 may be used for measuring stiffness/impedance, according to some embodiments. As described above in reference to FIG. 6F, in some embodiments, the actuator 604 is configured to provide sensor outputs, such as force, contact, displacement measurements to estimate the mechanical impedance of the actuator.

The method 700 also includes tuning (714) vibration output from the vibrotactile actuator based on a relationship between the mechanical impedance of the vibrotactile actuator, the tissue mechanical impedance of the target location, and the perceived vibration at the target location.

In some embodiments, the method 700 further includes tuning (716) the interface material between the vibrotactile actuator and the tissue for maximum transmission of the haptic stimulation. Examples of tuning (e.g., adjusting or changing) the interface material are discussed above in reference to FIGS. 5A, 5B, 6D, and 6E, according to some embodiments.

In some embodiments, the method 700 further includes tuning (718) mechanical coupling between the vibrotactile actuator and the housing to prevent parasitic leakage of vibrotactile signal in unintended directions (e.g., away from the direction of vibration 608). Examples of parasitic leakage of vibrotactile signal (sometimes called parasitic haptic signal leakage) are discussed in the Background section.

In some embodiments, vibrotactile haptic actuators are attached to the body by encapsulating the actuator in a housing, such as a bracelet, band, ring, glove, and by applying a mechanical coupling force or preload in the normal direction to the tissue about the target anatomical cross-section. Once the haptic actuator is secured to the anatomical cross-section of the body, a vibration is applied in the normal direction to the tissue surface. The strength of mechanical coupling between the actuator and the tissue, and the actuator and the housing affects the intensity of perceived vibration. The perceived vibration also changes based on the different anatomical locations that the actuator is coupled to. Some embodiments quantify gross tissue impedance under different preloads and over different anatomical locations.

As the preload force increases, the mechanical coupling between the actuator, its housing, and the tissue increases. Strong mechanical coupling causes the entire device and anatomical cross-section to vibrate. This parasitic haptic signal leakage limits the ability to apply localized vibrations in multi-actuator wearable devices and reduces perception of discrete and directional vibrational cues. The methods described herein improve the efficiency and consistency of the haptic throughput using the technique of z-shaping to isolate the haptic actuator from its housing. Some embodiments systematically tune the mechanical coupling between the actuator and the housing to prevent the parasitic leakage of vibrotactile signal in unintended directions. By changing the mechanical coupling of the motor to the encapsulation or housing by using a flexible or elastic element, such as a membrane or cantilever or rubber materials, some embodiments reduce the transmission of vibrations to the housing and improve the transmission of the vibration to the tissue.

In some embodiments, the method 700 further includes: (i) detecting (720), based on data from the one or more sensors, a change in the tissue mechanical impedance, during a session of use of the haptic device; and (ii) in response to detecting the change in the tissue mechanical impedance, adjusting (722) the vibration output from the vibrotactile actuator based on a degree of the change. Examples for detection of tissue mechanical impedance and adjusting vibration output from the vibrotactile actuator, during a session of use of the haptic device, are discussed above in the context of open-loop control strategy, according to some embodiments. Interactions with objects and changing pose, among other actions, can change the impedance of the tissues dramatically. Some embodiments use sensing mechanisms to measure the mechanical impedance of the tissue during a session of wearing the device and interacting with the world, adjust the vibration output from the vibrotactile actuator, and/or compensate for changing tissue mechanical impedance in vibrotactile haptic actuators.

In accordance with some embodiments, a non-transitory computer readable storage medium stores one or more programs configured for execution by an artificial reality device having one or more processors. The one or more programs include instructions for performing any of the methods described herein.

Thus, in various embodiments, systems and methods are described that create haptic stimulations. Various methods, systems, and devices are provided for creating haptic stimulations, for isolating and/or for tuning vibrations for artificial-reality environments. As wearable haptic displays continue to gain prevalence, the systems, devices, and methods described herein serve as means to add high quality haptic feedback to existing artificial-reality environments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. An apparatus for creating haptic stimulations, comprising:
 a brace that includes a first portion and a second portion;
 a vibrotactile actuator, coupled to the first portion of the brace, configured to apply a haptic stimulation to a user; and
 a linear actuator, coupled to the second portion of the brace, configured to:
  obtain a signal generated based on information about the user's body at a target location of the user; and
  adjust a tension of the brace according to the signal.

2. The apparatus of claim 1, further comprising one or more sensors configured to generate the information about the user's body at the target location.

3. The apparatus of claim 2, wherein a controller is configured to: (i) generate the signal based on the information about the user's body at the target location generated by the one or more sensors; and (ii) provide the signal to the linear actuator.

4. The apparatus of claim 3, wherein:
 the controller is part of the apparatus; and
 the controller is communicatively coupled to the linear actuator.

5. The apparatus of claim 2, wherein:
 the linear actuator is communicatively coupled to the one or more sensors;
 the one or more sensors are further configured to generate the signal based on the information about the user's body at the target location; and
 the linear actuator is configured to obtain the signal from the one or more sensors.

6. The apparatus of claim 2, wherein the information includes measurements of tissue biomechanics of the user's body at the target location.

7. The apparatus of claim 1, wherein adjusting the tension of the brace tunes vibration characteristics of the apparatus by minimizing vibrations transmitted from the vibrotactile actuator to the linear actuator.

8. The apparatus of claim 1, wherein the linear actuator is configured to adjust a radius of the brace in order to adjust the tension of the brace.

9. The apparatus of claim 1, wherein:
 the vibrotactile actuator is configured to move in one or more first directions;
 the linear actuator is configured to move in one or more second directions; and
 the one or more first directions are different from the one or more second directions.

10. The apparatus of claim 1, wherein the linear actuator adjusts the tension of the brace to (i) account for variations in tissue biomechanics at the target location and (ii) provide a uniform perception of vibration to the user.

11. The apparatus of claim 1, further comprising a housing that at least partially houses the vibrotactile actuator, the linear actuator, and the brace.

12. The apparatus of claim 1, wherein:
 the linear actuator is communicatively coupled to a computing device,
 the linear actuator is configured to obtain the signal from the computing device, and
 the computing device is configured to: (i) generate the signal based on the information about the user's body at the target location; and (ii) provide the signal to the linear actuator.

13. The apparatus of claim 12, wherein:
 the vibrotactile actuator is communicatively coupled to the computing device; and
 the vibrotactile actuator is further configured to: (i) receive vibration parameters from the computing device, and (ii) actuate based on the vibration parameters to apply the haptic stimulation to the user.

14. A wearable device comprising:
 a wearable structure to be worn on a portion of a user's body; and
 a plurality of haptic assemblies, wherein each haptic assembly is coupled to the wearable structure and comprises:
  a brace that includes a first portion and a second portion;
  a vibrotactile actuator, coupled to the first portion of the respective brace, configured to generate a haptic stimulation to a user; and
  a linear actuator, coupled to the second portion of the respective brace, configured to:
   obtain a signal generated based on information about the user's body at a target location of the user; and
   adjust a tension of the respective brace according to the signal, thereby generating localized vibrations to the user.

15. The wearable device of claim 14, wherein each brace is configured to improve power efficiency of the wearable device by generating the localized vibrations.

16. The wearable device of claim 14, wherein:
 a first haptic assembly of the plurality of haptic assemblies is configured according to biomechanics of tissue of the user at a first target location, and
 a second haptic assembly, distinct from the first haptic assembly, of the plurality of haptic assemblies is configured according to biomechanics of tissue of the user at a second target location, distinct from the first target location.

17. The wearable device of claim 16, wherein the first haptic assembly is positioned to be worn near the first target location and the second haptic assembly is positioned to be worn near the second target location.

18. The wearable device of claim 14, wherein the wearable structure is configured to be worn by the user by applying a tensioning force or a squeeze about an anatomical cross-section of the user's body.

19. The wearable device of claim 14, wherein:
 each vibrotactile actuator is communicatively coupled to a computing device; and
 each vibrotactile actuator is configured to vibrate at a respective frequency in response to receiving one or more signals from the computing device.

20. An artificial-reality device comprising: a head-mounted display that presents content to a user, the head-mounted display including an electronic display;
 a computing device that is (i) communicatively coupled to the head-mounted display and (ii) configured to generate and transmit one or more signals that correspond to content displayed on the electronic display; and
 a wearable device that is (i) communicatively coupled to the computing device and (ii) includes:
  a wearable structure to be worn on a portion of the user's body; and a plurality of haptic assemblies, each haptic assembly coupled to the wearable structure, and each haptic assembly including:
- a respective brace that includes a first portion and a second portion;
- a respective vibrotactile actuator, coupled to the first portion of the respective brace, configured to generate a haptic stimulation to a user; and
- a respective linear actuator, coupled to the second portion of the respective brace, configured to:
  - receive a respective signal, from the computing device, generated based on information about the user's body at a target location of the user; and
  - adjust a tension of the respective brace according to the signal, thereby generating localized vibrations to the user.

* * * * *